United States Patent
Merrill et al.

(10) Patent No.: US 9,681,676 B2
(45) Date of Patent: *Jun. 20, 2017

(54) CURD CONTAINING SLURRY COMPOSITIONS FOR MAKING SOFT OR FIRM/SEMI-HARD RIPENED AND UNRIPENED CHEESE

(71) Applicant: Leprino Foods Company, Denver, CO (US)

(72) Inventors: Richard K. Merrill, Highlands Ranch, CO (US); Mayank Singh, Aurora, CO (US)

(73) Assignee: Leprino Foods Corporation, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/064,372

(22) Filed: Oct. 28, 2013

(65) Prior Publication Data

US 2014/0178530 A1  Jun. 26, 2014

Related U.S. Application Data

(60) Continuation of application No. 12/686,018, filed on Jan. 12, 2010, now Pat. No. 8,613,970, which is a division of application No. 11/244,319, filed on Oct. 4, 2005, now Pat. No. 7,666,458, which is a continuation of application No. 11/121,398, filed on May 3, 2005, now Pat. No. 7,579,033.

(60) Provisional application No. 60/568,017, filed on May 3, 2004.

(51) Int. Cl.
| | | |
|---|---|---|
| A23C 19/00 | (2006.01) | |
| A23C 19/068 | (2006.01) | |
| A23C 19/082 | (2006.01) | |
| A23C 19/09 | (2006.01) | |

(52) U.S. Cl.
CPC ........ *A23C 19/0684* (2013.01); *A23C 19/082* (2013.01); *A23C 19/09* (2013.01)

(58) Field of Classification Search
CPC .... A23C 19/0684; A23C 19/082; A23C 19/09
USPC .... 426/34, 36, 580, 582, 519, 520, 521, 522
See application file for complete search history.

(56) References Cited

U.S. PATENT DOCUMENTS

| | | |
|---|---|---|
| 1,748,781 A | 2/1930 | Martin |
| 2,688,553 A | 9/1954 | Schicks et al. |
| 2,956,885 A | 10/1960 | Roundy et al. |
| 3,741,774 A | 6/1973 | Burkwall, Jr. |
| 3,961,077 A | 6/1976 | Kielsmeier |
| 3,998,700 A | 12/1976 | Reinbold et al. |
| 4,016,298 A | 4/1977 | Kasik et al. |
| 4,085,228 A | 4/1978 | Reinbold et al. |
| 4,137,397 A | 1/1979 | Dutta et al. |
| 4,244,983 A | 1/1981 | Baker |
| 4,268,528 A | 5/1981 | Montigny |
| 4,339,468 A | 7/1982 | Kielsmeier |
| 4,343,817 A | 8/1982 | Swanson et al. |
| 4,372,979 A | 2/1983 | Reinbold et al. |
| 4,397,878 A | 8/1983 | Koide et al. |
| 4,459,313 A | 7/1984 | Swanson et al. |
| 4,460,609 A | 7/1984 | Kristiansen et al. |
| 4,552,774 A | 11/1985 | Gronfor |
| 4,568,555 A | 2/1986 | Spanier |
| 4,592,274 A | 6/1986 | Tomatis |
| 4,608,921 A | 9/1986 | Mongiello, Sr. |
| 4,626,439 A | 12/1986 | Meyer |
| 4,665,811 A | 5/1987 | Meyer |
| 4,753,815 A | 6/1988 | Kielsmeier et al. |
| 4,766,076 A | 8/1988 | Sandine et al. |
| 4,894,245 A | 1/1990 | Kielsmeier et al. |
| 4,898,745 A | 2/1990 | Zamzow et al. |
| 4,919,943 A | 4/1990 | Yee et al. |
| 4,937,091 A | 6/1990 | Zallie et al. |
| 4,957,749 A | 9/1990 | Prieels et al. |
| 4,959,229 A | 9/1990 | Reddy et al. |
| RE33,508 E | 12/1990 | Kielsmeier et al. |
| 4,997,670 A | 3/1991 | Kielsmeier et al. |
| 5,030,470 A | 7/1991 | Kielsmeier et al. |

(Continued)

FOREIGN PATENT DOCUMENTS

| | | |
|---|---|---|
| EP | 0 535 728 A2 | 4/1993 |
| EP | 1 123 658 A2 | 8/2001 |

(Continued)

OTHER PUBLICATIONS

Anonymous, "Leprino Foods Operations & Maintenance Manual," APV Baker Inc., Apr. 30, 1992, No. 30-2047, pp. 1-69.
Breene, W.M., et al., "Manufacture of Pizza Cheese Without Starter", 1964, Journal of Dairy Science, 47:1173-1180.
Dulley, J.R. "The utilisation of cheese slurries to accelerate the ripening of cheddar cheese." Australian Journal of Dairy Technology, 1976, 31; 4: 4 pgs.
Further Examination Report for EP 05 747 013 dated Feb. 9, 2012, 5 pages.
International Search Report and Written Opinion of PCT/US05/15270 mailed on Sep. 20, 2006, 6 pages.
Kilcawley, K.N., et al. "Enzyme-Modified Cheese." International Dairy Journal, 1998, 8: 2 pgs.
Kosikowski, F.V. and Mistry, V.V. "Cheese and fermented milk foods." 3rd ed., Westport, Conn., 1997, 8 pgs.

(Continued)

*Primary Examiner* — Leslie Wong
(74) *Attorney, Agent, or Firm* — Kilpatrick Townsend & Stockton, LLP

(57) ABSTRACT

Methods and systems for preparing soft or firm/semi-hard cheese are provided, as well as soft or firm/semi-hard cheese prepared by the methods. The methods typically involve the formation of a slurry that contains blended or molten cheese curd. A variety of ingredients can be introduced into the curd used to prepare the slurry, the slurry that is formed, or at other stages along the manufacturing process to tailor the performance and nutritional characteristics of the final cheese product. The slurry in some methods is directly processed to form a final cheese product. In other methods, the slurry undergoes various types of processing to achieve certain desired composition or performance requirements.

30 Claims, 9 Drawing Sheets

(56) References Cited

U.S. PATENT DOCUMENTS

| | | |
|---|---|---|
| 5,080,913 A | 1/1992 | Gamay |
| 5,094,873 A | 3/1992 | Kerrigan et al. |
| 5,104,675 A | 4/1992 | Callahan et al. |
| 5,108,773 A | 4/1992 | Smith et al. |
| 5,200,216 A | 4/1993 | Barz et al. |
| 5,215,778 A | 6/1993 | Davison et al. |
| 5,225,220 A | 7/1993 | Gamay |
| 5,234,700 A | 8/1993 | Barz et al. |
| 5,234,707 A | 8/1993 | Merkenich et al. |
| 5,240,724 A | 8/1993 | Otto et al. |
| 5,244,687 A | 9/1993 | Rybinski et al. |
| 5,277,926 A | 1/1994 | Batz et al. |
| 5,320,860 A | 6/1994 | Duval et al. |
| 5,330,780 A | 7/1994 | Yee et al. |
| 5,336,765 A | 8/1994 | Au et al. |
| 5,350,595 A | 9/1994 | Hockenberry et al. |
| 5,374,443 A | 12/1994 | Jackson et al. |
| 5,380,543 A | 1/1995 | Barz et al. |
| 5,395,630 A | 3/1995 | Gamay |
| 5,413,804 A | 5/1995 | Rhodes |
| 5,431,931 A | 7/1995 | Nauth et al. |
| 5,431,946 A | 7/1995 | Vesely et al. |
| 5,462,755 A | 10/1995 | Mehnert |
| 5,466,477 A | 11/1995 | Sevenich |
| 5,470,595 A | 11/1995 | Kopp et al. |
| 5,480,666 A | 1/1996 | Lindgren |
| 5,484,618 A | 1/1996 | Barz et al. |
| 5,520,934 A | 5/1996 | Meilleur |
| 5,529,795 A | 6/1996 | Aldrovandi |
| 5,532,018 A | 7/1996 | Miller et al. |
| 5,549,916 A | 8/1996 | Gamay |
| 5,567,464 A | 10/1996 | Barz et al. |
| 5,612,073 A | 3/1997 | Gamay |
| 5,709,900 A | 1/1998 | Miller et al. |
| 5,750,177 A | 5/1998 | Yee et al. |
| 5,766,657 A | 6/1998 | Farkye et al. |
| 5,773,054 A | 6/1998 | Meibach et al. |
| 5,895,671 A | 4/1999 | Adamany et al. |
| 5,902,625 A | 5/1999 | Barz et al. |
| 5,906,854 A | 5/1999 | Scherping et al. |
| 5,925,398 A | 7/1999 | Rizvi et al. |
| 5,942,263 A | 8/1999 | Chen et al. |
| 5,952,030 A | 9/1999 | Nelles et al. |
| 5,967,026 A | 10/1999 | Nelles et al. |
| 6,007,852 A | 12/1999 | Reinbold et al. |
| 6,079,323 A | 6/2000 | Dzenis |
| 6,086,926 A | 7/2000 | Bruce et al. |
| 6,120,809 A | 9/2000 | Rhodes |
| 6,143,334 A | 11/2000 | Reinbold et al. |
| RE37,264 E | 7/2001 | Chen et al. |
| 6,303,160 B1 | 10/2001 | Laye et al. |
| 6,319,526 B1 | 11/2001 | Dahlstrom et al. |
| 6,322,841 B1 | 11/2001 | Jackson et al. |
| 6,326,038 B1 | 12/2001 | Brafford et al. |
| 6,358,543 B1 | 3/2002 | Soe et al. |
| 6,358,551 B1 | 3/2002 | Sadowsky, IV et al. |
| 6,372,268 B1 | 4/2002 | Silver et al. |
| 6,426,102 B1 | 7/2002 | Isom et al. |
| 6,440,481 B1 | 8/2002 | Gascoigne et al. |
| 6,455,081 B1 | 9/2002 | Han et al. |
| 6,475,538 B2 | 11/2002 | Thakar et al. |
| 6,475,638 B1 | 11/2002 | Mitsuhashi et al. |
| 6,506,426 B2 | 1/2003 | Adamany et al. |
| 6,536,691 B2 | 3/2003 | Prewitt et al. |
| 6,558,716 B1 | 5/2003 | Kent et al. |
| 6,562,383 B1 | 5/2003 | Moran et al. |
| 6,645,542 B2 | 11/2003 | Nelles et al. |
| 6,669,978 B2 | 12/2003 | Laye et al. |
| 6,773,740 B2 | 8/2004 | Hyde et al. |
| 6,780,445 B1 * | 8/2004 | Rhodes ............. 426/36 |
| 6,872,412 B2 | 3/2005 | Soe et al. |
| 6,905,721 B2 | 6/2005 | Jacobson et al. |
| 6,916,496 B2 | 7/2005 | Koka |
| 6,998,145 B2 | 2/2006 | Henry et al. |
| 7,169,429 B2 | 1/2007 | Merrill et al. |
| 7,579,033 B2 | 8/2009 | Merrill et al. |
| 7,585,537 B2 | 9/2009 | Merrill et al. |
| 7,651,715 B2 | 1/2010 | Merrill et al. |
| 7,666,458 B2 | 2/2010 | Merrill et al. |
| 7,695,745 B2 | 4/2010 | Johnston et al. |
| 7,713,564 B2 | 5/2010 | Merrill et al. |
| 7,842,325 B2 | 11/2010 | Fitzsimons et al. |
| 7,976,886 B2 | 7/2011 | Merrill et al. |
| 8,241,691 B2 | 8/2012 | Merrill et al. |
| 8,642,106 B2 * | 2/2014 | Merrill et al. ............. 426/582 |
| 2003/0104106 A1 | 6/2003 | Trecker et al. |
| 2004/0018292 A1 | 1/2004 | Lindstrom et al. |
| 2004/0076729 A1 | 4/2004 | Jaskulka |
| 2005/0196509 A1 | 9/2005 | Murphy |
| 2005/0249853 A1 | 11/2005 | Merrill et al. |
| 2005/0249854 A1 | 11/2005 | Merrill et al. |
| 2005/0271789 A1 | 12/2005 | Merrill et al. |
| 2006/0083820 A1 | 4/2006 | Merrill et al. |
| 2006/0083821 A1 | 4/2006 | Merrill et al. |
| 2006/0083822 A1 | 4/2006 | Merrill et al. |
| 2010/0062110 A1 | 3/2010 | Elston et al. |
| 2010/0112137 A1 | 5/2010 | Merrill et al. |
| 2010/0239713 A1 | 9/2010 | Merrill et al. |
| 2011/0097441 A1 | 4/2011 | Merrill et al. |
| 2011/0229622 A1 | 9/2011 | Merrill et al. |
| 2012/0328737 A1 | 12/2012 | Merrill et al. |
| 2014/0134294 A1 | 5/2014 | Merrill et al. |

FOREIGN PATENT DOCUMENTS

| | | |
|---|---|---|
| JP | H09-172964 A | 7/1997 |
| JP | H09-172965 A | 7/1997 |
| JP | 11-332462 | 12/1999 |
| NZ | 199366 A | 5/1986 |
| WO | 02-089592 A1 | 11/2002 |
| WO | 03/037093 A1 | 5/2003 |
| WO | 03/069982 A1 | 8/2003 |
| WO | 2004/057971 A1 | 7/2004 |
| WO | 2005-104859 A2 | 11/2005 |
| WO | 2005/107486 A2 | 11/2005 |

OTHER PUBLICATIONS

Kristoffersen, T., et al. "Cheddar Cheese Flavor. IV. Directed and Accelerated Ripening Process." Journal of Dairy Science, 1966, 50; 3: 6 pgs.

Larson, W., et al., "Continuous Direct Acidification System for Producing Mozzarella Cheese," Presented at the 64th Annual Meeting of the American Dairy Science Association, Jun. 28-Jul. 1, 1970, 8 pages.

Law, B.A. "Technology of Cheesemaking." 1st ed, Sheffield Academic Press, 1999, 32 pgs.

Miyamoto, Y., et al., "Production of lactobionic acid from whey by *Pseudomonas* sp. LS13-1," Biotechnology Letters, 2000, vol. 22, No. 5, pp. 427-430.

Murakami, H., et al., "Fermentative Production of Lactobionic Acid by Burkholderia cepacia," Journal of Applied Glycoscience, 2003, vol. 50, No. 2, pp. 117-120.

New Zealand Patent Office, Patent Application No. 199366 for New Zealand Dairy Board, filed Mar. 20, 1982, 16 pages.

Rand, Jr., A., et al., "Direct Enzymatic Conversion of Lactose in Milk to Acid," Journal of Dairy Science, 1975, vol. 58, No. 8, pp. 1144-1150.

Scott, R., Cheesemaking Practice, Second Edition, "Chapter 13—Cheesemaking Operations," Elsevier Applied Science Publishers, London/New York, 1986, pp. 186-212.

Shehata, A., et al., "Effect of Type of Acid Used in Direct Acidification Procedures on Moisture, Firmness, and Calcium Levels of Cheese," Journal of Dairy Science, 1967, vol. 50, No. 6, pp. 824-827.

Singh, S. and Kristoffersen T. "Factors Affecting Flavour Development in Cheddar Cheese Slurries." Journal of Dairy Science, 1969, 53; 5: 3 pgs.

Supplemental European Search Report for EP 05 747 013 dated Jul. 31, 2009, 5 pages.

(56) References Cited

OTHER PUBLICATIONS

Sutherland, B.J. "Rapidly ripened cheese curd slurries in processed cheese manufacture." Australian Journal of Dairy Technology, 1975, 30; 4: 4 pgs.
Talbott, L., et al.. "The use of enzyme modified cheeses for flavouring processed cheese products." Proceedings from the Second Biennial Marschall International Cheese Conference, Madison, Wisconsin, USA, Sep. 15-19, 1981, 26 pages.
Document 1, Kraft Opposition of Australian Patent # 2005240120 filed Oct. 22, 2010, 14 pages.
Document 2, Kraft Opposition of Australian Patent # 2005240120 filed Oct. 19, 2011, 62 pages.
Document 3, Kraft Opposition of Australian Patent # 2005240120 filed Sep. 12, 2013, 62 pages.
Document 4, Kraft Opposition of Australian Patent # 2005240120 filed Feb. 25, 2013, 12 pages.
Document 5, Kraft Opposition of Australian Patent # 2005240120 filed Feb. 14, 2014, 17 pages.
Document 6, Kraft Opposition of Australian Patent # 2005240120 filed May 30, 2013, 12 pages.
Document 1, Fonterra Opposition of Australian Patent # 2005240120 filed Oct. 22, 2010, 20 pages.
Document 2, Fonterra Opposition of Australian Patent # 2005240120 filed Sep. 1, 2013, 13 pages.
Document 3, Fonterra Opposition of Australian Patent # 21005240120 filed Sep. 1, 2011, 69 pages.
Document 4, Fonterra Opposition of Australian Patent # 2005240120 filed Aug. 31, 2011, 2 pages.
Document 5, Fonterra Opposition of Australian Patent # 2005240120 filed Dec. 9, 2011. 6 pages.
Document 6, Fonterra Opposition of Australian Patent # 2005240120 filed. Aug. 31 2011, 4 pages.
Document 7, Fonterra Opposition of Australian Patent # 2005240120 filed Feb. 25, 2013, 14 pages.
Document 8, Fonterra Opposition of Australian Patent # 2005240120 filed May 30, 2013, 12 pages.
Document 9, Fonterra Opposition of Australian Patent # 2005240120 filed Aug. 6, 2013, 26 pages.
Document 10, Fonterra Opposition of Australian Patent # 2005240120 filed Feb. 14, 2014, 16 pages.
Document 1, Kraft Opposition of Australian Patent# 2010212424 filed Aug. 26, 2011, 1 page.
Document 2, Kraft Opposition of Australian Patent# 2010212424 filed Jun. 14, 2012, 72 pages.
Document 3, Kraft Opposition of Australian Patent# 2010212424 filed Apr. 22, 2014, 235 pages.
Document 4, Kraft Opposition of Australian Patent# 2010212424 filed Apr. 16, 2014, 12 pages.
Document 5, Kraft Opposition of Australian Patent# 2010212424 filed Dec. 19, 2012, 9 pages.
Document 1, Fonterra Opposition of Australian Patent # 2010212424 filed Aug. 26, 2011, 1 page.
Document 2, Fonterra Opposition of Australian Patent # 2010212424 filed Dec. 10, 2013, 16 pages.
Document 3, Fonterra Opposition of Austrailan Patent # 2010212424 filed Dec. 6, 2013, 2 pages.
Document 4, Fonterra Opposition of Australian Patent # 2010212424, 14 pages.
Document 5, Fonterra Opposition of Australian Patent # 2010212424 filed May 30, 2013, 12 pages.
Document 6, Fonterra Opposition of Australian Patent # 2010212424 filed Dec. 19, 2012, 9 pages.
Document 7, Fonterra Opposition of Australian Patent # 2010212424 filed Apr. 24, 2014, 180 pages.
Document 8, Fonterra Opposition of Australian Patent # 2010212424 filed Apr. 24, 2014, 162 pages.
Document 9, Fonterra Opposition of Australian Patent # 2010212424 filed Apr. 24, 2014, 115 pages.
Document 1, Kraft Opposition of New Zealand Patent# 550846 filed Aug. 11, 2011, 17 pages.
Document 2, Kraft Opposition of New Zealand Patent# 550846 filed Oct. 10, 2011, 4 pages.
Document 3, Kraft Opposition of New Zealand Patent# 550846 filed Jun. 14, 2012, 53 pages.
Document 4, Kraft Opposition of New Zealand Patent# 550846 filed Jun. 14, 2012, 51 pages.
Document 5, Kraft Opposition of New Zealand Patent# 550846 filed Jun. 24, 2014, 41 pages.
Document 6, Kraft Opposition of New Zealand Patent# 550846 filed Dec. 17, 2014, 104 pages.
Document 1, Fonterra Opposition of New Zealand Patent # 550846 filed Jul. 29, 2011, 15 pages.
Document 2, Fonterra Opposition of New Zealand Patent # 550846 filed Sep. 2011, 5 pages.
Document 3, Fonterra Opposition of New Zealand Patent # 550846 filed Jul. 2011, 12 pages.
Document 4, Fonterra Opposition of New Zealand Patent # 550846 filed Dec. 11, 2012, 60 pages.
Document 5, Fonterra Opposition of New Zealand Patent # 550846 filed Nov. 21, 2014, 99 pages.
Document 6, Fonterra Opposition of New Zealand Patent # 550846 filed Dec. 5, 2014, 54 pages.
Document 7, Fonterra Opposition of New Zealand Patent # 550846 filed Jan. 30, 2015, 5 pages.
Document 8, Fonterra Opposition of New Zealand Patent # 550846 filed Jan. 30, 2015, 7 pages.
Document 9, Fonterra Opposition of New Zealand Patent # 550846 filed Jan. 30, 2015, 7 pages.
Document 10, Fonterra Opposition of New Zealand Patent # 550846 filed Feb. 2015, 42 pages.
"Traditional Cheesemaking" [Accessed on Nov. 3, 2015. Retrieved from the internet: <URL: http://collections.infocollections.org/ukedu/en/d/Jsk17te/5.2.html>].
Patent Examination Report No. 2 issued on Sep. 18, 2015 in Australian Patent Application No. 2013203256, filed May 3, 2005. 6 pages.
Non-Final Office action for U.S. Appl. No. 13/861,003, mailed on Mar. 7, 2018, all pages.

\* cited by examiner

CURD CONTAINING SLURRY COMPOSITIONS FOR MAKING SOFT OR FIRM/SEMI-HARD RIPENED AND UNRIPENED CHEESE

CROSS-REFERENCE TO RELATED APPLICATIONS

This application is a continuation of U.S. patent application Ser. No. 12/686,018, filed Jan. 12, 2010, now U.S. Pat. No. 8,613,970, which is a divisional of U.S. patent application Ser. No. 11/244,319, filed Oct. 4, 2005, now U.S. Pat. No. 7,666,458, which is a continuation of Ser. No. 11/121,398 filed May 3, 2005, now U.S. Pat. No. 7,579,033, which claims priority to U.S. Provisional App. No. 60/568,017, filed May 3, 2004, and titled "Methods Making Soft or Firm/Semi-Hard Ripened and Unripened Cheese", the entire contents of which are herein incorporated by reference for all purposes.

This application is also related to the following U.S. Patent Applications, all of which are incorporated herein by reference in their entirety for all purposes:

U.S. Provisional App. No. 60/568,029, filed May 3, 2004, entitled "Soft or Firm/Semi-Hard Ripened or Unripended Cheese and Methods of Making Such Cheeses,";

U.S. Provisional App. No. 60/568,022, filed May 3, 2004, entitled "Soft or Firm/Semi-Hard Ripened or Unripened Blended Cheeses and Methods of Making Such Cheeses";

U.S. Patent Application filed on the same day as the present application, and entitled "Cheese and Methods of Making Such Cheese,"; and U.S. Patent Application filed on the same day as the present application, and entitled "Blended Cheeses and Method for Making Such Cheeses,".

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheese is utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be prebaked before being put in the oven with the cheese. Each of these variables potentially impacts the composition of the cheese required to provide satisfactory performance.

Demand for cheese with varying performance characteristics is also driven in part by the significant increase in the different types of baking equipment and conditions that are being used to prepare food products containing soft or firm/semi-hard cheese. Some baking operations, for instance, require relatively high oven temperatures (e.g., in the range of about 350 to 950° F. (177-510° C.)) with short baking times (e.g., in the range of about 30 seconds to 15 minutes). Such conditions may be used, for instance, in an impingement oven when baking a pizza having a thin crust. Other ovens, such as deck ovens, in contrast, sometimes use a relatively long bake time (e.g., about 6 to 60 minutes) and a correspondingly lower oven temperature (e.g., about 300 to 750° F. (149 to 399° C.)). Instead of baking, some foods topped with or including soft or firm/semi-hard cheese are prepared by microwaving (e.g., about 1-6 minutes).

Consumer demand for cheeses with improved nutritional content (e.g., nutritionally balanced, lower fat) has also increased the demand for new varieties of soft or firm/semi-hard cheese.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing soft or firm/semi-hard cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In view of the demand for cheese and the foregoing shortcomings associated with some existing methods for preparing cheeses with the desired performance characteristics, there thus remains a need for additional methods for preparing cheeses of various types.

SUMMARY

A variety of methods for preparing soft or firm/semi-hard ripened or unripened cheese are provided. Cheese produced by the methods and systems for conducting the methods are also provided.

Some cheese manufacturing methods involve blending a cheese curd and one or more ingredients together to form a slurry. The slurry is processed by performing one or more processes selected from the group consisting of cooking the slurry, subjecting the slurry to high shear conditions, homogenizing the slurry, and adjusting the moisture content of the slurry. Once the slurry has been processed, one or more additional ingredients can be mixed into the slurry to form an admixture. The resulting admixture is formed into a cheese. In some methods, the slurry is cooked in the absence of exogenous water.

The ingredients blended into the slurry can be selected from a wide variety of ingredients including, but not limited to, nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Other methods for preparing cheese involve blending a cheese curd, and optionally water and/or one or more ingredients, to form a slurry. The slurry is processed by cooking the slurry and performing one or more processes selected from the group consisting of subjecting the slurry to high shear conditions, homogenizing the slurry and adjusting the moisture content of the slurry. The processed slurry is then shaped and cooled to form the soft or firm/semi-hard cheese.

Still other cheese preparation methods involve providing an admixture that comprises a cheese curd and one or more ingredients selected from the group consisting of a starch, a dairy solid, a gum and a cellulose agent. The admixture is then shaped and cooled to form the soft or firm/semi-soft cheese. In some methods, the concentration of the starch, the dairy solid, the gum or the cellulose agent in the admixture is sufficient such that the soft or firm/semi-hard cheese that is produced has one or more of the following characteristics (i) a starch concentration of at least 0.1 wt %, (ii) a dairy solid concentration of at least 0.1 wt %, or (iii) a gum or cellulose agent concentration of at least 0.1 wt %.

Methods for preparing a slurry that can be used in the preparation of a soft or firm/semi-hard ripened or unripened cheese are also disclosed. Some of these methods involve blending a cheese curd and one or more ingredients together to form a slurry. The slurry is then processed by heating the slurry to a temperature of about 90° F. to about 293° F. and performing one or more of the processes selected from the group consisting of subjecting the slurry to high shear conditions, homogenizing the slurry, and adjusting the moisture content of the slurry to about 36 to 65 wt. %, thereby forming the heated slurry.

Also included are slurries that can be used in the preparation of a soft or firm/semi-hard ripened or unripened cheese. Some slurries include a cheese curd and one or more ingredients, wherein the one or more ingredients are selected from the group consisting of a starch, a dairy solid, a gum and a cellulose agent, and wherein the slurry may have one or more of the following characteristics (i) a starch concentration of at least 12 wt % or (ii) a dairy solid concentration of at least 12 wt %, or (iii) a gum or cellulose concentration of at least 12 wt %.

Cheese manufacturing systems are also provided. Certain of these systems comprise a slurry preparation system, which itself includes a blender adapted to blend a cheese curd and one or more ingredients together to form a slurry and a first dispenser operatively disposed to introduce the one or more ingredients into the slurry. The slurry preparation system also includes a subsystem comprising at least one of the following units (i) a cooker adapted to heat the slurry to a temperature of about 90° F. to about 293° F.; (ii) a shear pump adapted to subject the slurry to high shear conditions; and (iii) a homogenizer adapted to homogenize the one or more ingredients in the slurry; and (iv) an evaporator adapted to adjust the water content of the slurry to about 35-65% by weight, wherein at least one unit is in communication with the blender and the units within the subsystem are in fluid communication.

The manufacturing system also includes a second dispenser and a mixer operatively disposed to receive the slurry from the slurry preparation system and to receive one or more ingredients from the second dispenser, and adapted to mix the slurry with the one or more ingredients to form an admixture. Finally, the manufacturing system includes a final processing system operatively disposed to receive the admixture and adapted to form a final cheese product.

Soft and firm/semi-hard cheeses produced by the methods disclosed herein are also provided.

DETAILED DESCRIPTION

I. Definitions

Figure 1A:
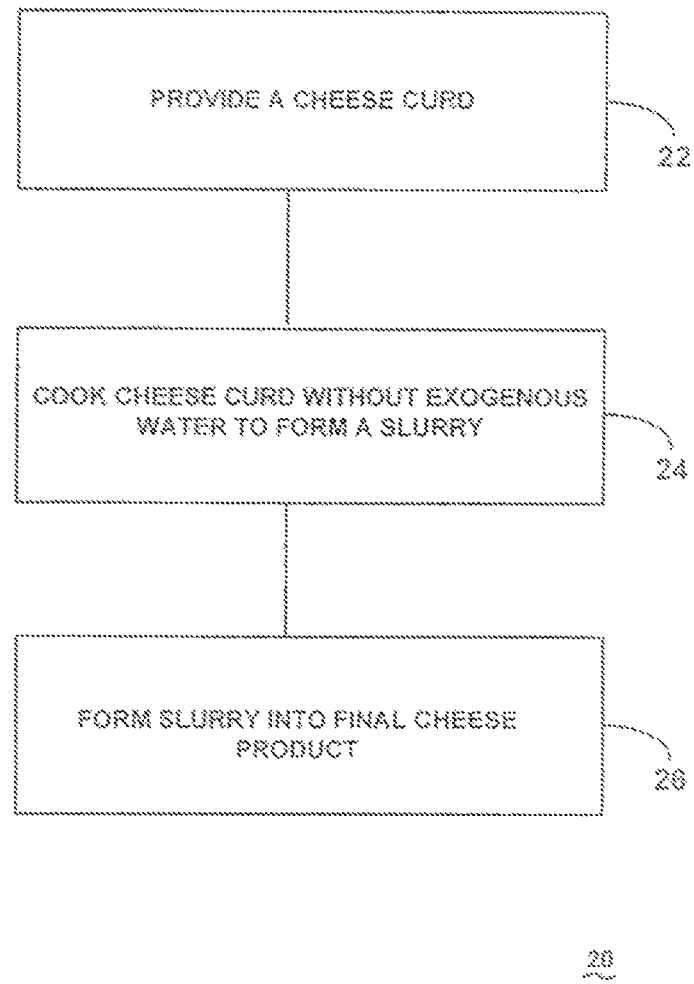
FIG. 1A depicts one example of a method for preparing a soft or firm/semi-hard cheese that involves a cooking step that is conducted in the absence of exogenous water.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and chesses with a MFFB, for example, of about 58% to about 75%, by wt. The term encompasses a variety of well known cheeses including, but not limited to Colby, Havarti, Monterey Jack, Gorgonzola, Gouda, Cheshire and Muenster, which are examples of "firm/semi-hard cheeses." Also included in the term are "soft" cheeses, which may have a MFFB of greater than about 60%, by wt. A variety of mozzarella cheeses are included by the term; these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters as set forth above.

The "soft" and "firm/semi-hard" cheeses that are provided include standard and non-standard cheeses having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% be weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §1.33.155-133.158.

II. Overview

Methods and systems for preparing a variety of cheese products such as soft or firm/semi-hard cheese are provided. The methods typically involve the formation of a slurry that contains blended or molten cheese curd. A variety of ingredients can be introduced into the curd used to prepare the slurry, the slurry that is formed, or at other stages along the manufacturing process to tailor the performance and nutritional characteristics of the final cheese product. The slurry in some methods is directly processed to form a final cheese product. In other methods, the slurry undergoes various types of processing to achieve certain desired composition or performance requirements.

The methods, for instance, can be used to introduce various ingredients, either in the slurry and/or with another component of the cheese, to control: 1) melt and flowability of the final cheese product, which is a measure of how well the cheese melts and flows into a homogenous mass, preferably with little or no individual shreds of cheese still detectable; 2) stretch, which is a measure of the ability of the cheese to form interconnected strings when the heated cheese is pulled; 3) texture, which is a measure of chewiness and smoothness; 4) coloring, which is a measure of the actual color of the melted cheese; 5) blister characteristics, which may include size, color and extent of coverage; and/or 6) nutritional composition.

In some methods, the slurry is processed so it is in a form that confers useful properties on the final cheese product and/or facilitates preparation of the cheese. Some methods, for instance, utilize a heated slurry that may also have been sheared and/or homogenized. Such processing can influence the performance of the final cheese product in various ways. For example, this processing can be used to achieve higher concentrations of certain ingredients in the final cheese product as compared to traditional approaches. Without intending to be bound by theory, it is believed that the shearing and homogenization process can reduce particle size of the components of some cheese ingredients. These resulting particles because of their reduced size are thus better able to become incorporated into the overall cheese matrix, thereby allowing more ingredients to be introduced into the final cheese product.

The reduced particle size also makes it easier to remove excess water during the manufacturing process to the level desired in later manufacturing stages. The ability to control water content is an important factor in being able to regulate the stability of cheese and thus its shelf life. Reduced particle size also facilitates forming a compact cheese that can be easily processed (e.g., shredded, sliced, or diced). Shearing and homogenization can also be important in reducing the viscosity of the slurry, which aids in various processing steps (e.g., transport of the slurry).

Use of a slurry that has been heated, sheared and/or homogenized during the manufacturing process also is useful in activating, exposing the functionality and/or in hydrating the ingredients, such that the ingredient has different properties than the corresponding unheated ingredients. As a specific example, it can be difficult to incorporate non-fat dry milk into a cheese as a dry powder in certain cheese manufacturing methods because the non-fat dry milk never becomes fully hydrated. This makes the non-fat dry milk susceptible to burning when cooked, for example. By using certain of the slurry-based methods disclosed herein, ingredients such as non-fat dry milk can be better hydrated, thus mitigating against the burning problem. The hydration of other ingredients can have other beneficial results.

Some methods also involve a process in which the water content of the slurry is adjusted. This is useful because the water content in a cheese is an important factor in stability, shelf life and the ability to slice, shred and dice the final cheese product.

In sum, the use of slurries to introduce ingredients into cheeses at certain stages of the manufacturing process can be used to help tailor the performance and nutritional characteristics of the final cheese product.

II. Methods for Preparing Soft or Firm/Semi-Hard Cheeses

A. General

Some of the methods for preparing a soft or firm/semi-hard cheese that are provided herein involve the general approach shown in FIG. 1A. Method 20 which is shown in this figure involves providing a cheese curd 22 and then cooking 24 the cheese curd in the absence of exogenous water to form a slurry containing molten cheese (mass of molten cheese). This slurry is subsequently formed 26 into the final soft or firm/semi-hard cheese product. In some variations on this general approach, various ingredients such as described herein can be incorporated into the cheese curd before cooking and/or into the slurry after cooking Methods of incorporating ingredients into a cheese curd and then processing it that can be utilized in some methods disclosed herein are described in copending U.S. application Ser. No. 10/300,019, which is incorporated herein by reference in its entirety for all purposes.

The term "exogenous water" as used herein refers to water that is used to bathe the curd and which is subsequently separated from the molten cheese mass that is formed. A problem that can be associated with certain methods that utilize exogenous water to heat the curd is that, when the water is separated, valuable protein, fat, and other solids that otherwise would be bound up in the finished cheese are removed. Various cookers can be used to heat the cheese curd in the absence of exogenous water. One option is the RotaTherm™ cooker available from Gold Peg International Pty. Ltd. (Moorabbin, Vic, Australia).

Figure 1B:
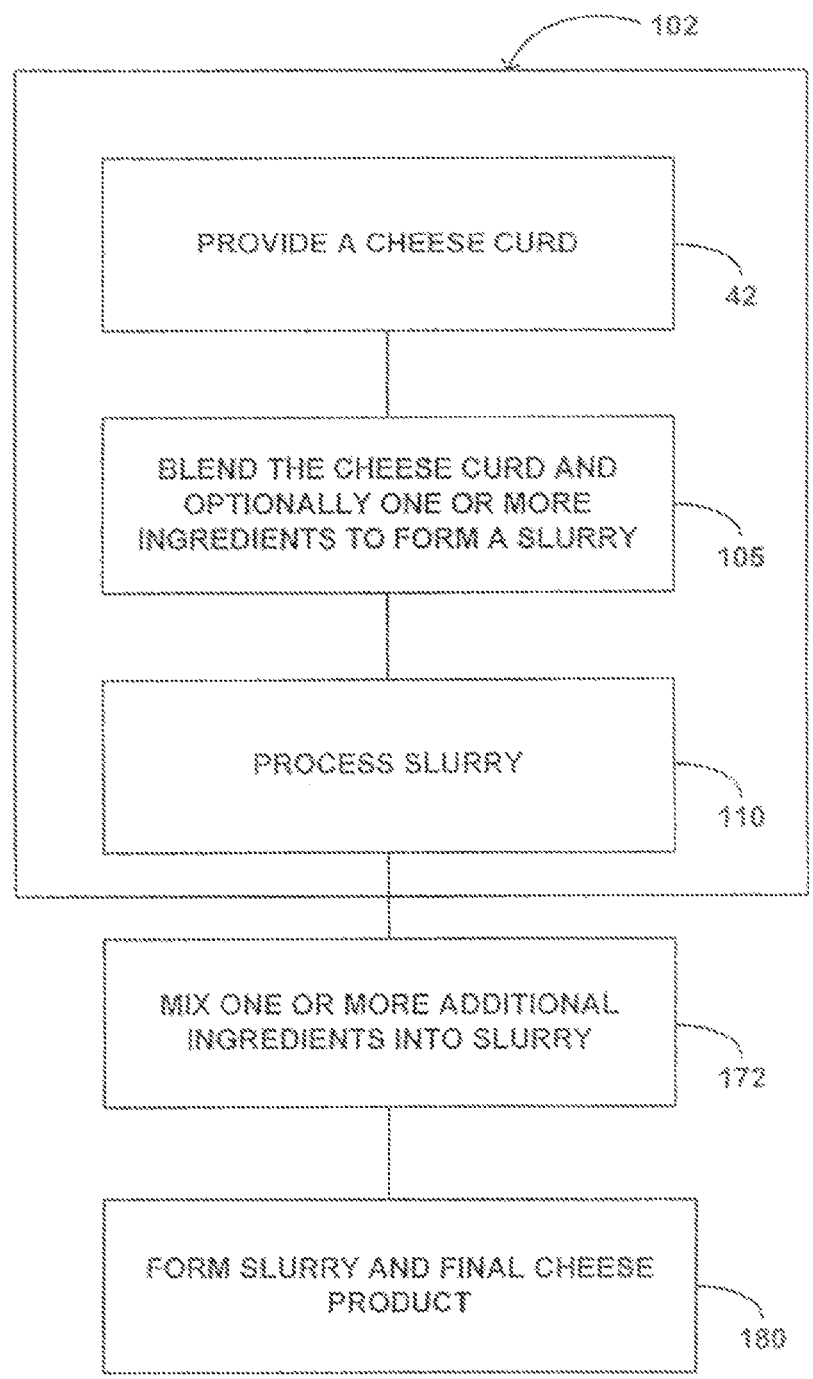
FIG. 1B provides another exemplary method for preparing a soft or firm/semi-hard cheese in which ingredients can optionally be incorporated into a curd and then again later in the process after the curd has been processed.

Another general method is illustrated in FIG. 1B. Method 40 includes a slurry preparation process 102, which includes providing 42 a curd, blending 105 the curd, optionally with one or more ingredients, to form a slurry, and processing 110 (e.g., cooking, shearing, homogenizing, adjusting moisture content) the slurry. One or more additional ingredients are then mixed 172 into the processed slurry. The slurry is then finally formed 180 into the final soft or firm/semi-hard cheese product. Although method 40 includes the incorporation of ingredients into the cheese curd and the processed slurry (see processes 105 and 172), other methods may not include one or both of these steps. Furthermore, although this particular method shows the addition of ingredients during the blending 105 process, ingredients can in other methods be added at any stage during the slurry preparation process 102 (e.g., during processing of the slurry).

Additional detail regarding these general steps and further examples of specific methods are provided in the following sections. Then examples of specific methods are provided.

1. Slurry Preparation and Processing

The process of preparing the slurry generally involves: 1) blending cheese curd, and optionally a liquid (e.g., water, milk, cream or oil) and/or one or more ingredients, to form the slurry, and 2) optionally processing the slurry. So, in some methods, the slurry that is produced is directly processed into a final cheese product. In other methods, the slurry is processed to adjust the slurry to a form that mixes well with the ingredients that are added and/or to create a composition that is suitable for later processing.

The cheese curd utilized in the blending process can be prepared, for example, from pasteurized cow's milk, buffalo milk, goat's milk, or other milk source (e.g. concentrated milk, reconstituted milk or milk protein powders). The milk is acidified to form cheese milk. The acidification step can be performed either microbially, directly, or a combination of microbial and direct acidification. Microbial acidification is accomplished by the addition of a starter culture of one or more lactic acid-producing bacteria to the milk, and then allowing the bacteria to grow and multiply. When making a mozzarella variety cheese, a bacterial starter culture composed of coccus, rods, or a combination of both is preferably used. In some methods of acidification, an acid added as a processing aid, such as acetic acid (e.g., vinegar), phosphoric acid, citric acid, lactic acid, hydrochloric acid, sulfuric acid, or glucono-delta lactone (GdL), lactobionic acid, etc., is added to standardize pH and is followed by addition of microbial starter to complete the acidification process. Following addition of the microbial and/or GRAS acids, the cheese milk is coagulated to form a coagulum that consists of cheese curd and whey. Rennet or other suitable enzyme(s) is typically added to the milk to enhance the coagulation activity. The resulting coagulum is cut and the whey drained off to obtain the cheese curd. The curd can optionally be scalded (cooked) for about 0.08 to 1.0 hours at about 86-120° F. (30-49° C.), at which point the curd is ready to undergo the heating and kneading operation.

When dairy milk is used as a precursor, the sweet cream fraction of the milk, or a portion thereof, may be separated and replaced by other types of creams and/or fats prior to acidification. For example, the sweet cream may be replaced by whey cream and/or pro-cream (i.e., a mixture of protein and cream) that is included with the whey fraction that is separated from the cheese curd. The replacement of the dairy sweet cream, or a portion thereof, with the whey cream and pro-cream reduces waste by making use of the whey cream and pro-cream, as well as making the higher value sweet cream available for sale in the marketplace.

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Procream" is the liquid milk product high in fat collected as retentate from a whey filtration process such as microfiltration which may have been adjusted by adding thereto: whey, concentrated whey, dry whey, or other GRAS ingredients.

The process of blending the curd, and optional liquid (e.g., water) and/or ingredient(s) together can be accomplished by a variety of techniques. One approach is to use a horizontal twin screw (auger) blender. Other options include the use of a ribbon blender or forcing the slurry through a pipeline that includes a series of pumps and static mixers. The curd, optional water and/or ingredient(s) can be blended together as part of a single step. Typically low shear treatment is used in this mixing step, but higher shear may be used if curd particle size reduction is desired. The blending operation occurs at between 60-130° F., and continues until a homogeneous mixture is obtained.

Slurry processing typically includes cooking the slurry, typically to about 90-293° F. or 100-250° F., but this is not required in some methods. It can also optionally include one, two or all of the following processes: (1) subjecting the slurry to high shear conditions, (2) homogenizing the slurry, and/or (3) adjusting the water content of the slurry, usually to about 35-65, or 45-60 wt. %.

Different methods can incorporate different combinations of two or all three of the foregoing optional processes. So, for example, in some methods, the pre-mixing processing involves (1) and (2) but not (3). Other processes include (1) and (3) but not (2). Still other pre-mixing processes include (2) and (3) but not (1). And still other processes include (1), (2) and (3). The other remaining combinations can also be utilized depending upon the particular requirements of an application. The other remaining combinations can also be utilized depending upon the particular requirements of an application. In some instances, it is sufficient to simply shear the slurry without homogenizing it. But the pre-mixing process may involve both, in which case the slurry is first typically sheared and then homogenized, although the order can be reversed.

In some methods, some slurry processing steps are optionally carried out at the same time (e.g., subjecting the slurry to high shear conditions while homogenizing the slurry; or heating the slurry while subjecting it to high shear conditions and/or homogenizing the slurry). Cooking can optionally be performed during shearing and/or homogenizing. Cooking can also be done before or after the shearing and homogenizing processes, if they are included in the overall method. In general, however, the slurry processing steps conclude by adjusting the water content of the slurry.

Heating of the slurry can be accomplished in a variety of ways, including 1) direct steam injection, 2) indirect heating via an indirect heat exchanger, mechanical energy, or radiation (e.g., microwave). The steam injection option generally involves releasing live steam into the cooking chamber. When live steam is used, the steam condensate is absorbed by the curd and forms part of the final mass of cheese. Indirect heating can be accomplished, for example, by conduction, through the wall of the cooker, e.g., by use of a hot water jacket. As noted above, some slurries are heated using a cooker in which heating occurs without exogenous water.

Some ingredients need to be subjected to high shear conditions to become functional (e.g., hydrated or converted to a form that displays functional binding groups). High shear conditions as used herein generally refer to conditions in which the slurry is subjected to a shear rate of 10,000-500,000 $s^{-1}$. In some methods, the slurry is typically sheared by passing the slurry through a shear pump, at a temperature of about 90-293° F. (32-145° C.) for about 0.01-0.5 seconds. In some methods, the slurry is typically sheared by a high-shear mixer or colloid mill.

Homogenization of the slurry, if performed, generally involves a process of reducing the particle size of fluid products under conditions of extreme pressure, shear, turbulence, acceleration and impact, to make them more stable and have a better texture. The effect is achieved by forcing the product through a homogenizing valve at high pressure. Homogenization is accomplished in one or multiple steps. For most slurries, two steps are sufficient. It is common that the main homogenization takes place in the first homogenization valve and a mild homogenization in the second valve. The second homogenization valve will enhance the product quality. It will break down the newly formed fat globule clusters formed directly after the first valve. Homogenization is usually conducted at a temperature of about 90-293° F. (32-145° C.) for about 0.01-0.5 seconds.

As indicated above, if the water content of the slurry is adjusted, the moisture content is generally adjusted to about 35-65%, and in some instances from about 45-60%. The temperature during this process is typically about 110-150° F. (e.g., 140° F.).

2. Addition of Ingredients

Ingredients of a variety of types (see below) can optionally be added to the cheese curd that goes into making the slurry and/or at later stages (e.g., once the slurry has been processed). These ingredients are sometimes added in a dry form (e.g., as a powder), but in some instances can be added in liquid form. Powdered solids can be added using any of a number of conventional approaches, including sprinkling the solids into the slurry, usually after application of ingredients in liquid form, if any. Liquid agents or ingredients can be sprayed down onto the surface of the slurry.

3. Mixing of Ingredients into Slurry or Curd

Ingredients can be mixed into the curd or slurry using various mixing techniques that are conventional in the industry. In certain methods, for example when ingredients are added to the slurry, the mixing is performed at a temperature of about 100 to about 150° F. The temperature in some applications is relatively high, such as between 160-180° F. (71-82° C.). In other methods, the temperature is at or slightly below that of pasteurization (65° C., 150° F.), for example in the range of about 145-150° F. (63-65° C.). Mixing is usually conducted for about 2-15 or 5-10 minutes. Mixing is generally performed under low shear conditions.

4. Final Processing/Forming Slurry into Final Cheese Product

Final processing of the slurry generally involves shaping and cooling the slurry to form a desired final product. In general, the slurry containing the heated and/or blended cheese curd can be formed into any desired shape depending upon the ultimate intended use. General options include, but are not limited to, 1) forming relatively large pieces of cheese which are packaged; 2) comminuting the cheese into smaller pieces that are packaged without freezing but instead refrigerated; 3) comminuting, packaging and freezing the cheese, and 4) comminuting, freezing, then packaging the cheese.

In some methods, for instance, the slurry is extruded as a continuous Ribbon™, which is discharged into a cold sodium chloride brine channel or tank, for example as described in U.S. Pat. No. 4,339,468 to Kielsmeier or U.S. Pat. No. 5,200,216 to Barz et al. (both of which are incorporated herein in their entirety). The cheese Ribbon™ is sometimes contacted with cold sodium chloride brine (in one or more tanks or vessels) until its core temperature drops to about 75° F. (24° C.) or below. Then the cooled Ribbon™ can be cut into segments having dimensions suitable for the intended use of the cheese.

Other options include: 1) floating the cheese in a coolant; 2) placing the cheese on a perforated belt and spraying coolant on the cheese surface; 3) placing the cheese on a solid belt and spraying coolant on the underside of the belt; 4) transfer through a cooling chamber; and 5) refrigeration of the heated cheese.

If a string cheese is the desired product [e.g., a cheese having a diameter of about ⅛ to 1.0 inch (0.32 to 2.54 cm.)], the segments of the string are generally about 1½ to 12 inches (4 to 30.5 cm) long. If the string cheese is to be baked only while enclosed in pizza crust (e.g., in a stuffed crust pizza), it typically is unnecessary to age the cheese before using it. If desired, the string cheese can be frozen and stored.

The warm cheese can also be molded/extruded into blocks of any of a variety of sizes that are convenient. Some blocks, for example, are about 4 inches high, 4-8 inches wide, and 4-24 inches long.

If the finished cheese is to be used as an exposed topping for a pizza, then the continuous Ribbon™, typically is rectangular in cross section, and can be cut into loaves, for example having a width of about 4 to 36 inches (10 to 92 cm.), a height of about 1/16 to 4 inches (0.15 to 10 cm.), and a length of about 4 to 36 inches (10 to 92 cm.). The loaves can then be further cooled in sodium chloride brine, for example to a core temperature in the range of about 26 to 75° F., and then removed from the brine and comminuted, and the pieces individually quick frozen, for example by the process described in U.S. Pat. No. 5,030,470 to Kielsmeier, et al., which is hereby incorporated herein by reference.

Depending on the composition of the cheese, it may be preferable to store it for a time [e.g., about 7 to 21 days, at about 35 to 45° F. (2 to 7° C.)] after it is removed from the last brine tank and before it is comminuted and frozen. However, as described in U.S. Pat. No. 5,200,216 (Barz et al.), if the process is controlled such that the cooled cheese removed from the brine has a moisture content of about 45 to 60 wt. %, a milk fat content of at least about 30 wt. % (dried solids basis), and a combined moisture and wet milk fat content of at least about 70 wt. %, the cheese can be frozen immediately and will still perform satisfactorily when baked on a pizza, under a variety of conditions.

The final processing procedure can also be as described in U.S. Pat. No. 5,902,625, which is incorporated herein by reference in its entirety for all purposes.

B. Exemplary Methods

Utilizing the foregoing processes, a variety of different methods can be designed that are appropriate to a particular application. Examples of such methods follow. It should be understood, however, that these methods are simply illustrative of other arrangements that could be utilized.

Figure 2:
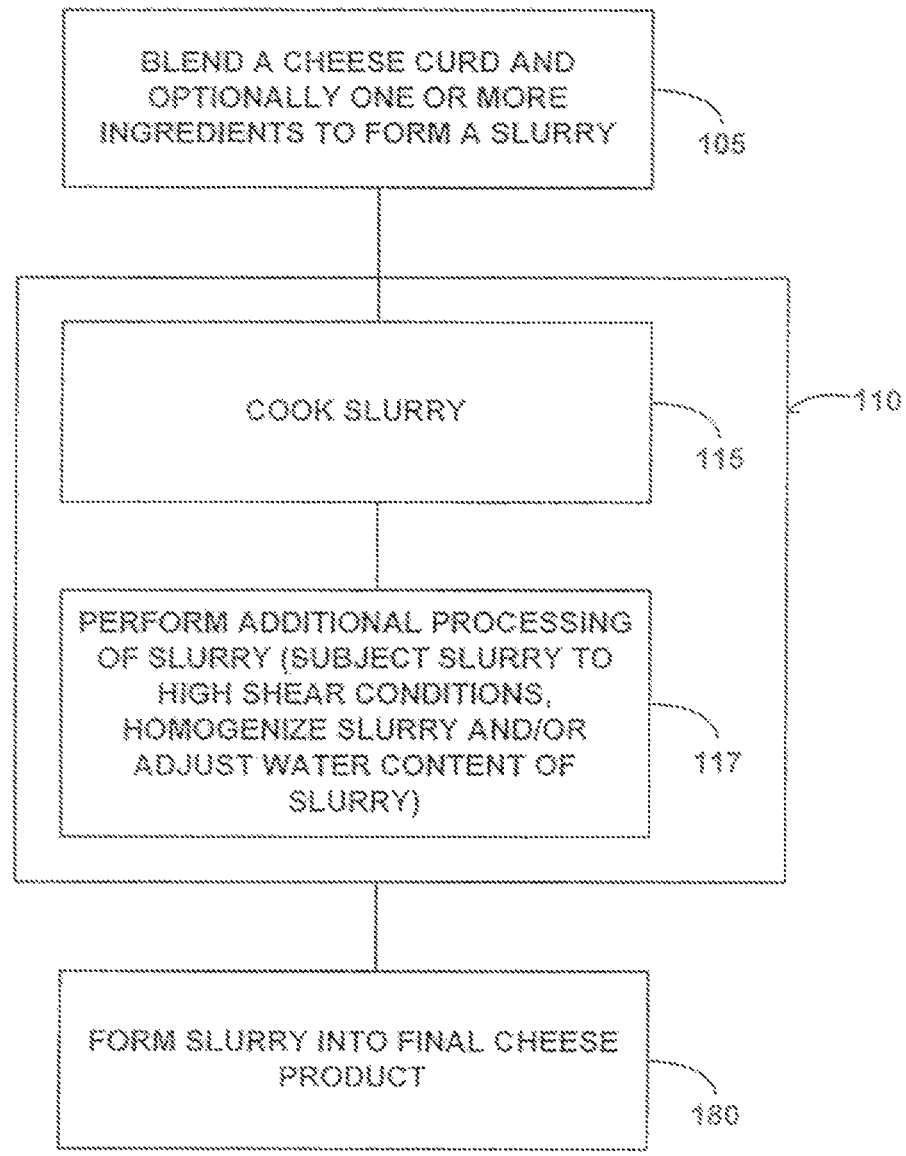
FIG. 2 shows an exemplary method for preparing a soft or firm/semi-hard cheese that involves cooking a blended cheese curd and an additional processing step.

FIG. 2 illustrates one specific example of a method for preparing a soft or firm/semi-hard cheese. In this particular method, ingredients are optionally introduced during curd blending. Ingredients can also be introduced after slurry processing (not shown). As shown in FIG. 2, in method 60 a cheese curd and one or more optional ingredients are blended 105 to form a slurry. The slurry is then processed 110. Processing 110 in this particular method involves cooking the slurry 115 and performing 117 one or more additional processes. These additional processes include subjecting the slurry to high shear conditions, homogenizing the slurry and/or adjusting the water content of the slurry. The resulting slurry is then formed 180 into a final soft or firm/semi-hard cheese product.

Figure 3:
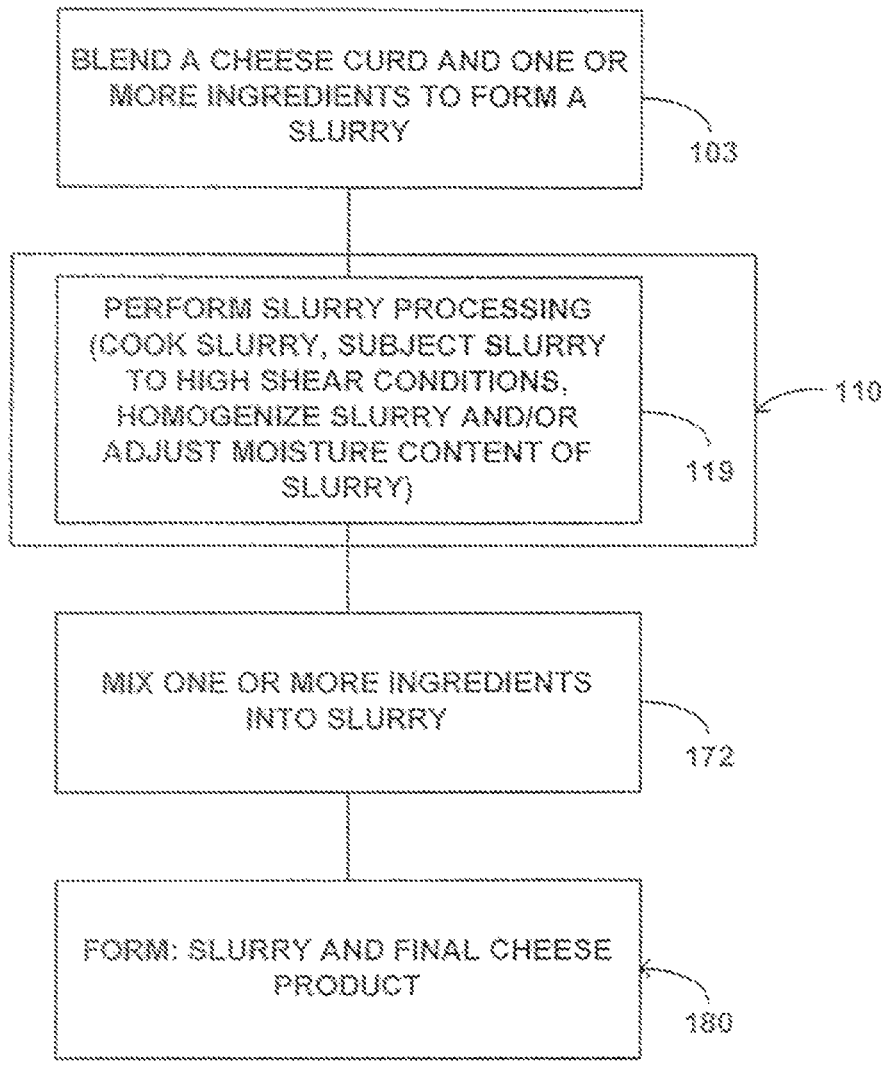
FIG. 3 illustrates another exemplary method for preparing a soft or firm/semi-hard cheese that involves addition of ingredients at two stages along the preparation process, specifically to the initial cheese curd and to a slurry containing blended curd formed after processing of the cheese curd.

FIG. 3 depicts another exemplary method. This particular method illustrates an approach in which one or more ingredients are introduced during the curd blending process to form a slurry and after processing of the slurry. Process 80 initially involves blending 103 a cheese curd and one or more ingredients to form a slurry. Slurry processing 110 in this instance involves performing 119 one or more of the following processes: cooking the slurry, subjecting the slurry to high shear conditions, homogenizing the slurry, and/or adjusting the water content of the slurry. The processed slurry is then mixed 172 with one or more ingredients. The slurry is then formed 180 into the desired final cheese product.

Figure 4:
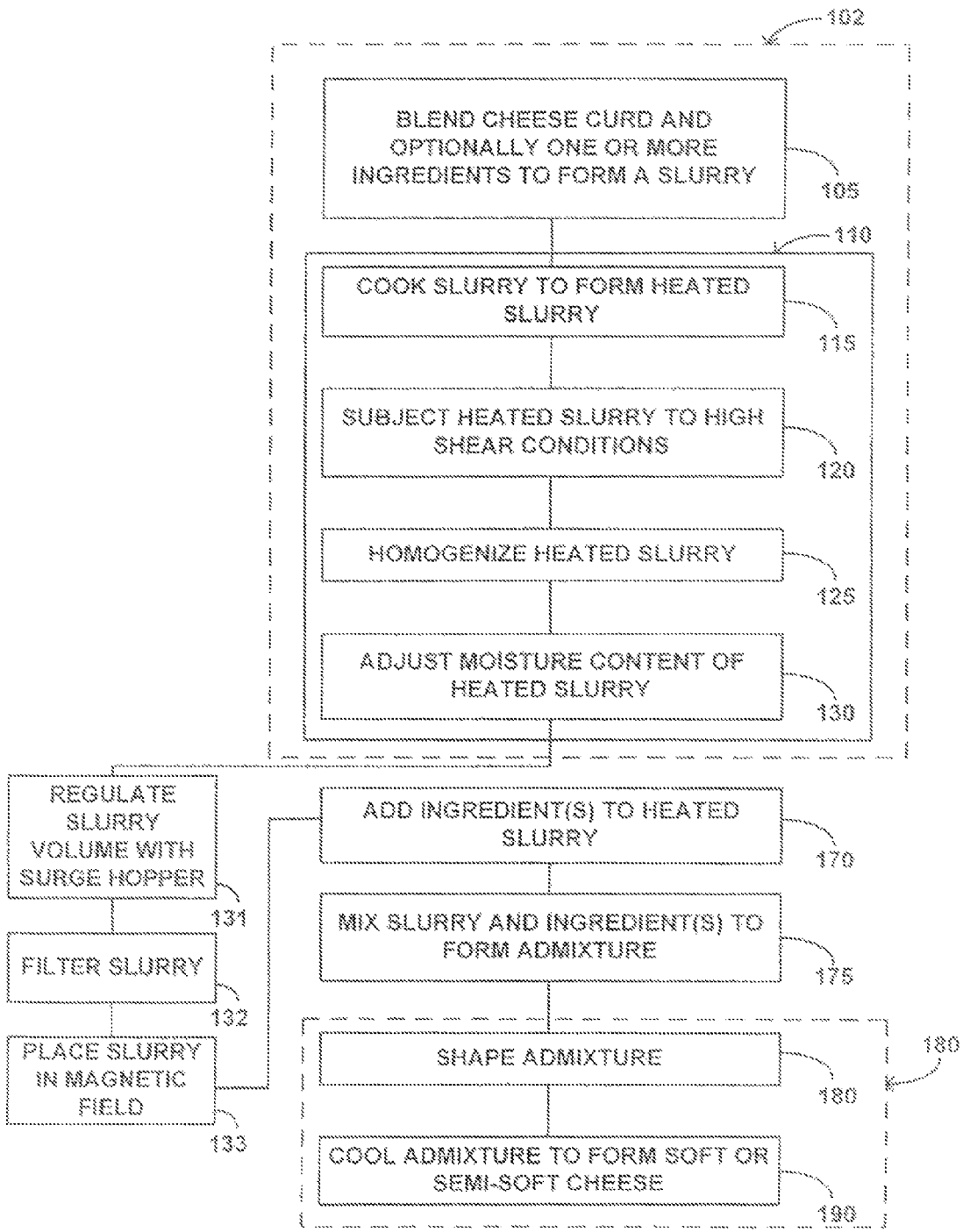
FIG. 4 depicts another example of a method for preparing a soft or firm/semi-hard cheese that illustrates exemplary slurry processing steps.

Another exemplary method is shown in FIG. 4. Method 100 illustrates a number of the various slurry processing options that can be incorporated into the methods that are provided. As can be seen, in method 100, the slurry preparation process 102 initially involves blending 105 cheese curd (optionally a liquid (e.g., water) and/or one or more ingredients) to form the initial slurry. Slurry processing 110 in this instance involves cooking/heating 115 the resulting slurry to about 90-300° F. This heated slurry is then subjected 120 to high shear conditions and then homogenized 125. Thereafter the water content of the heated slurry is adjusted 130 to about 45-60 wt. %. The slurry is transferred to the combining and mixing state 170 through the use of a pump at the discharge of a surge hopper, which maintains the slurry at a constant volume 131. As the slurry is transferred, it may be filtered 132 to remove any large particles formed in the slurry during the cooking/heating step 115 (or other extraneous materials), and also exposed to a magnetic field 133 to remove any metal fragments in the slurry generated by metal to metal contact of the moving parts of the process equipment.

Once the heated slurry has been heated, sheared, homogenized and/or the water content adjusted to the desired range, one or more ingredients are added 170 to the slurry and then mixed 175 together to form an admixture. The resulting admixture is subsequently processed 180 to form the final soft or firm/semi-hard cheese product. In the particular method depicted in FIG. 4, final processing 180 involves shaping 185 the admixture into a desired form and cooling 190 the shaped cheese to form the final cheese product. Although FIG. 4 shows the final processing step to first involve the shaping process followed by the cooling process, this order can be reversed or performed simultaneously.

The final processing 180 of each of the exemplary methods shown in FIGS. 2-4 can involve any of the processing options described above or generally known in the art. So, for example, in some methods final processing involves individually quick-freezing pieces of the cheese as described in U.S. Pat. No. 5,030,410. Other methods involve a same day dice procedure such as described, for example, in U.S. Pat. No. 5,200,216. In still other methods, the cheese is not comminuted but formed into blocks that is directly packaged and refrigerated. Those of skill will recognize that a variety of other processing options are available.

III. Slurry Ingredients and Non-Slurry Ingredients

A. General

A number of different types of generally recognized as safe (GRAS) ingredients can be incorporated into the slurry and optionally added at other stages of the overall manufacturing process as described herein. If added at a stage other than the slurry, most ingredients can generally be added as a powder or as part of a solution. The ingredients that are incorporated are selected, for example, to tailor the performance, nutritional, and taste characteristics of the final soft or firm/semi-hard cheese product. Some of the methods that are provided involve the addition of ingredients other than those commonly used in the production of an analog cheese. Such methods thus omit one, some or all of the following: an oil, a fat, a protein, a starch, a sequestrant and a salt. Other methods, however, incorporate one, some or all of these ingredients.

As noted above, some of the ingredients included in the slurry generally fall into two general categories: 1) ingredients that one seeks to incorporate at relatively high concentration levels; and 2) ingredients that need to be heated and/or hydrated to become functionalized, i.e., to be converted into a form that has the chemical and/or physical properties that are important for obtaining a final cheese product with the desired characteristics or composition. But a variety of other ingredients can also be included in the slurry.

Examples of such ingredients include, but are not limited to, nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Examples and additional specific information regarding the types of ingredients that can be incorporated to tailor the performance, nutritional and taste characteristics of the final soft or firm/semi-hard cheese product follow.

Dairy Solids.

A dairy solid can be added to improve various characteristics of the final cheese products such as: firming the cheese, improving water binding capacity, improving the melt appearance of the cooked cheese, and/or increasing the blistering of the cooked cheese. Dairy solids that can be utilized include, but are not limited to, whey protein concentrate, casein hydrolyzate, milk fat, lactalbumin, cream, milk protein concentrate, milk protein isolate, lactose, casein, whey protein isolate, hydrolyzed whey protein, denatured whey protein, skim cheese powder, natural casein isolate and nonfat dry milk. In general, dairy solids can be incorporated into the final product from about 0.5-25 wt. %.

Incorporation of a dairy solid such as non-fat dry milk into a heated slurry is one approach for obtaining relatively high concentration levels in the final product. For example, the dairy solid concentration in some soft or firm/semi-hard cheeses that are prepared according to the methods disclosed herein can be at least 0.1 wt. % and in other instances considerably higher such as at least 10, 11, 12 or 13 wt. %, and can include, for example, up to about 16, 17, 18, 19, 20 or 25 wt. % of the final product. Thus, the concentration of the dairy solids is generally adjusted such that the level of dairy solid in the final cheese product is about 0.5-25, about 3-18, about 4-16, or about 11-25 wt. %.

Starches.

Incorporating starches into the heated slurry is also beneficial in some instances because the functionality of some starches is increased when heated, hydrated and/or subjected to high shear conditions. Once functionalized in this manner, the starch can thicken or gel to bind to proteins in the cheese (e.g., casein). In general, starch can be incorporated into the final product in the range of about 0.5-20 wt. %.

Some methods add starch such that the starch concentration in the final cheese product is at least 0.1, 1, 4, 10, 11, 12, 13 or 20 wt. %. Thus, in some instances, the starch concentration can range from about 4-20 wt. % or from about 5-16 wt. % in the final cheese product.

A number of different types of starches can be incorporated into the final cheese product. Suitable starches include vegetable starches (e.g., potato starch, pea starch, and tapioca) and grain starches (e.g., corn starch, wheat starch, and rice starch). Specific examples of suitable corn starches include dent corn starch, waxy corn starch, and high amylose corn starch. The starches can be used individually or in combination.

The starch can be modified or native. Modified food starches differ in their degree of cross-linking, type of chemical substitution, oxidation level, degree of molecular scission, and ratio of amylose to amylopectin. Examples of some commercially-available modified food starches that are suitable include Mira-Cleer 516, Pending 200, Purity 660, Batterbind SC, Penbind 100, MiraQuick MGL, Novation 3300, and Gel-n-Melt. A suitable commercially-available native (unmodified) starch is Hylon V.

Mira-Cleer 516, from A. E. Staley Company, is a dent corn starch that is cross-linked and substituted with hydroxypropyl groups. The cross-linking increases its gelatinization temperature and acid tolerance. The hydroxypropyl substitution increases its water binding capability, viscosity and freeze-thaw stability. MiraQuick MGL, also from A. E. Staley Company, is an acid-thinned potato starch. The acid thinning breaks amylopectin branches in the starch, creating a firmer gel. Batterbind SC, from National Starch, is a cross-linked and oxidized dent corn starch. Purity 660, also from National Starch, is a cross-linked and hydroxypropyl substituted dent corn starch. Hylon V, also from National Starch, is an unmodified, high amylose corn starch. Pending 200, from Penwest Foods, is an oxidized potato starch. The oxidation increases its capacity to bind water and protein. Penbind 100, also from Penwest Foods, is a cross-linked potato starch.

Emulsifiers, Gelling Agents, Stabilizers and Thickeners.

Gums, celluloses, and alginates are some examples of emulsifiers, gelling agents, stabilizers and thickeners. Many of the considerations that apply to starches also apply to gums and celluloses. Certain gums and celluloses, for example, should be hydrated and/or heated to realize their full functional characteristics. Heating and hydration also enables increased levels of the gums, celluloses, or alginates to be included in the final product. Some of the soft and firm/semi-hard cheeses that are provided herein contain at least about 0.01, 0.1, 0.5 or 3.0 wt. % gum, cellulose, or alginate. The products thus generally have a gum, cellulose, or alginate concentration of about 0.01-3.0 wt. %.

Different types of celluloses can also be incorporated into the cheese. The cellulose can be either natural or modified. One cellulose or combinations of different celluloses can be utilized. Types of celluloses that can be utilized include, but are not limited to, microcrystalline cellulose, powdered cellulose, methyl cellulose, propylene glycol alginate, and sodium alginate. One specific example of a commercially available modified cellulose is METHOCEL A-15™ that is available from Dow Chemical Company (Midland, Mich.).

Examples of suitable gums that can be incorporated include, but are not limited to, xanthan gum, guar gum, konjac flour and locust bean gum. Examples of suitable stabilizers include chondrus extract (carrageenan), pectin, gelatin, and agar.

The total amount of gums and stabilizers included in the final cheese product is typically up to about 0.01, about 0.50, or about 3.0% by weight. More specifically, the amount of gums and/or stabilizers can range from about 0.01 to 3.0%, from about 0.25 to 2.5%, or from about 0.5 to 2.0% by weight of the final cheese product.

Acidity Regulators, Anticaking Agents, and Firming Agents.

Acidity regulators, anticaking agents, and firming agents of various types can be included in the cheese. Typically, these agents are inorganic salts, but other types of acidity regulators, anticaking agents, and firming agents can also be used. Examples of acidity regulators, anticaking agents, and firming agents may include calcium chloride, tricalcium phosphate, calcium hydroxide, powdered cellulose, disodium phosphate, and potassium hydroxide. These agents are typically added as part of a solution, (but could be used as a powder).

The total amount of acidity regulators, anticaking agents, and firming agents incorporated into a slurry is sufficient so the concentration of the acidity regulators, anticaking agents, and firming agents in the final cheese product is generally up to about 0.05, 1.2, or 3.0% by weight. More specifically, the amount of acidity regulators, anticaking agents, and firming agents can range from about 0.05 to 3.0%, from about 0.1 to 2.5%, or from about 0.5 to 2.0% by weight.

Sequestrants.

A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, trisodium citrate and potassium phosphate), calcium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight.

Acids.

An acid can be incorporated to adjust the pH of the finished cheese to a desired level. Various acids can be employed; examples of suitable acids include, but are not limited to, adipic acid, lactic acid, glucono-delta-lactone, phosphoric acid, lactobionic acid, hydrochloric acid, acetic acid, or Genlac C, the latter being a blend of water, citric acid, lactic acid, acetic acid and artificial flavors. Acid is typically added to adjust the pH of the finished cheese to a pH from about 5-6, and more typically from pH 5.10-5.70. An acid is added to the slurry as a processing aid to cause a reduction in slurry viscosity before cooking, making the slurry easier to pump through the cooker and other system equipment.

Cheese Powders.

Cheese powders can also be mixed into the cheese to impart a different cheese flavor to the finished product. Such powders are typically added to the heated cheese mass formed during the pasta filata process as a powder rather than as part of the slurry.

Examples of suitable cheese powders include, but are not limited to, Parmesan, cheddar, Monterey Jack, Romano, muenster, Swiss, and provolone powders. The amount of cheese powder in the finished cheese is generally about 0.25 to 10%, and in some instances about 1.05 to 5% by weight. Cheese powders are available from a variety of commercial suppliers, including, for example, Armour Foods of Springfield, Ky.

Colorants.

A colorant can be incorporated into the cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella Annatto-colored mozzarella can be used as a replacement for cheddar cheese in many food products (e.g., Mexican-style prepared foods). Tumeric imparts a yellowish color to mozzarella, which naturally is white. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Colorants can be incorporated into the final cheese product by inclusion in the slurry. If added apart from the slurry, the colorant is generally sprayed onto the heated cheese mass as an unheated solution or dispersion in water. The amount of colorant added is typically in the range of about 0.01 to 2%, based on the weight of the finished cheese. Tumeric, if used, is generally added in an amount of about 0.05 to 0.2%. If annatto is added, it normally is added to about 0.1 to 0.3% by weight.

Flavoring Agents.

Various flavoring agents can also be incorporated into the cheese to tailor the flavor profile of the cheese to meet consumer preferences. Suitable flavors for mixing into the heated cheese include, for example, cheddar cheese flavor and parmesan cheese flavor. Flavoring agents are typically added in an amount such that the concentration in the final cheese product is within the range of about 0.01 to 5 wt. %.

Non-Dairy Protein Isolate.

A non-dairy protein isolate can also be incorporated into the cheese. It is to alter the texture of the cheese and/or to change the size, color, or integrity of the blisters that are formed when the cheese is baked on a pizza, as well as other cook characteristics. Examples of suitable non-dairy protein isolates include, but are not limited to, soy protein (sometimes called "soy powder"), gelatin, wheat germ, corn germ, gluten, and egg solids.

The protein isolate is added such that the concentration of the protein isolate in the final cheese product is up to about 1, 15 or 30 wt. %.

Oils.

Various oils can also be incorporated into the cheese. They are generally added to alter the fatty acid profile and/or cost of the cheese and/or to change the size, color, or integrity of the blisters that are formed when the cheese is baked, as well as other cook characteristics. Examples of suitable oils include, but are not limited to, vegetable oil, soy bean oil, corn oil, flax seed oil, walnut oil, palm oil, linoleic acid, fish oil, omega 3 fatty acids, and medium chain triglycerides, among others. Any of the oils may be partially or completely hydrogenated. If blended into the initial slurry, the oil is added in a concentration such that the concentration of the oil in the final cheese product is up to about 1.0, 20 or 35 wt. %.

Salt.

Salts of various types, but typically sodium chloride, can be added to tailor the flavor of the final cheese. The salt can be incorporated into the final cheese product by including it in the heated slurry or by adding it in granular form or as an unheated solution apart from the slurry. Regardless of how introduced, the salt concentration in the final cheese product is usually added at a level of about 0.1-5 wt. %. When added as an ingredient of the slurry, this means that the salt concentration in the slurry is generally about 0.1 to 2.0 wt. %.

Antifoaming Agents.

Various antifoaming agents can be incorporated to facilitate processing. Examples include, but are not limited to, microcrystalline wax, oxystearin and polydimethylsiloxane.

Carbohydrates.

A variety of simple sugars (e.g., mono- and disaccharides), as well as more complex carbohydrates can be included in the cheese. Examples include, but are not limited to, glucose, sucrose, and fructose.

Enzymes.

Enzymes may be used to create flavors, texture, melt, and/or other functional characteristics in the final cheese product, and/or in the slurry that can then be transferred to the final cheese product once the slurry and cheese have been mixed together. Examples of such enzymes, and this is not an all inclusive list, would be lipases, proteases, oxidoreductases, and transglutaminase.

Neutraceuticals.

Neutraceuticals may be included to deliver nutrients not normally present in cheese. Examples of neutraceuticals include, but are not limited to lycopene, antioxidants, probiotics, prebiotics, phosphatidylserine, vegetable sterols, immunoglobulins. These products in particular may be added as part of the slurry or to the mixer (mixer 190, FIG. 4).

IV. Slurries

Compositions in the form of slurries that contain one or more of the ingredients listed in the preceding section are also provided. The slurries primarily are comprised of molten cheese curd and optionally water. But the slurries can also include one or more of the ingredients listed in the preceding section in the concentration ranges listed. Curd makes up about 25-100 wt. % of the slurry, and water about 0-10 wt. % in some slurries.

V. Systems for Preparing Soft or Firm/Semi-Hard Cheese

Figure 5:
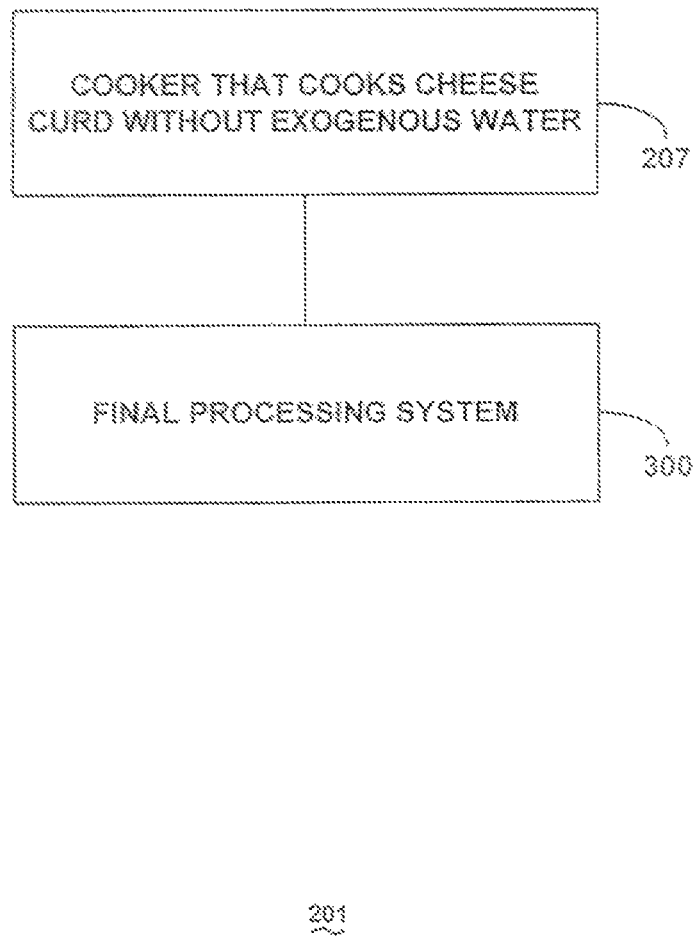
FIG. 5 depicts an exemplary cheese preparation system that utilizes a cooker that heats curd in the absence of exogenous water.

One general system for preparing a soft or firm/semi-hard cheese is shown in FIG. 5. This particular system 201 includes a cooker 207 that can cook cheese curd without exogenous water. This cooker 207 is connected to a final processing system 300 via transfer tube 299. The cooker 207 may also be connected to another transfer tube (not shown) that delivers the curd, and optional ingredients, to the cooker 207. Systems such as this are useful for performing methods such as depicted in FIG. 1A, for example.

Figure 6:
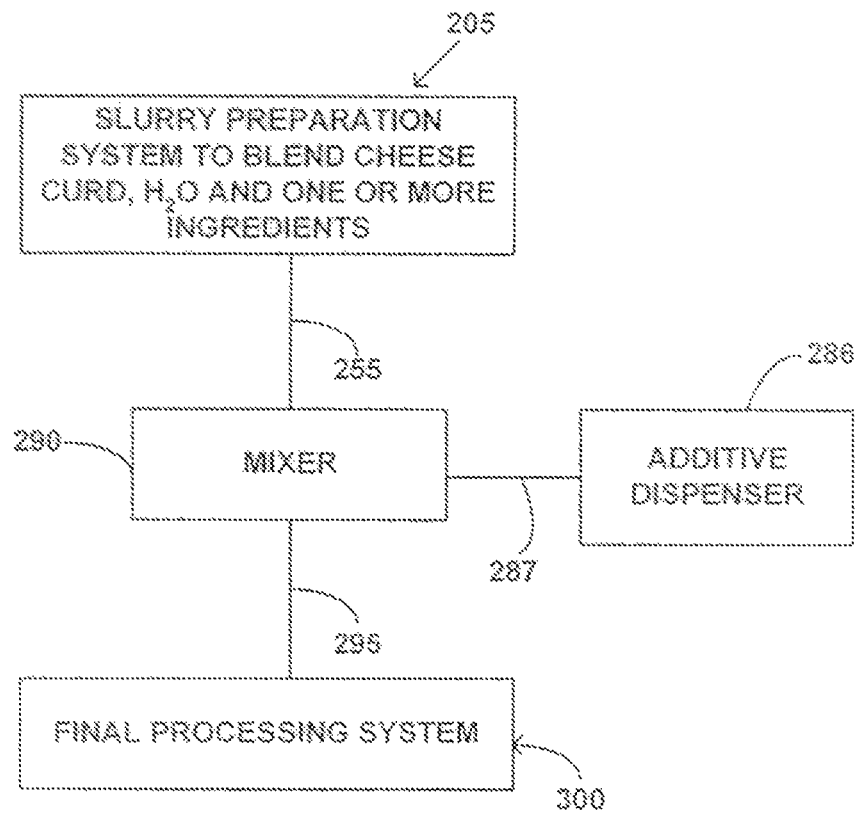
FIG. 6 shows an example of systems that can be utilized to prepare the soft or firm/semi-hard cheeses that are provided herein.

FIG. 6 depicts another example of a generalized system that can be used to carry out the foregoing methods to prepare soft and firm/semi-hard cheeses such as are described herein. As this figure illustrates, one system design 200 involves the following basic subsystems: (1) a slurry preparation system 205, (2) a mixer 290, (3) additive dispenser 286, and (4) a final processing system 300.

In exemplary system 200, slurry preparation system 205 is used to blend together the cheese curd, and optionally a liquid (e.g., water) and ingredient(s), to prepare the initial slurry. This preparation system 205 is in communication with mixer 290 via transfer tubes 255. Additive dispenser 286 is connected with mixer 290 via transfer tube 287. Mixer 290 is also in communication with final processing system 300. Thus, the admixture formed by the mixing of the slurry and ingredients introduced by the additive dispenser in mixer 290 can be transported to final processing system 300 via transfer tube 295. In the final processing system 300, the admixture is shaped and cooled to form the final soft or firm/semi-hard cheese product.

A wide variety of different systems that are provided herein have this general design. Although specific examples of such systems are described below, it should be understood that these systems are only examples and not intended to be exhaustive of the types of systems that can be used to carry out the cheese processing methods that are described herein or of the type of systems that can be used to prepare the type of cheeses that are disclosed herein.

Figure 7:
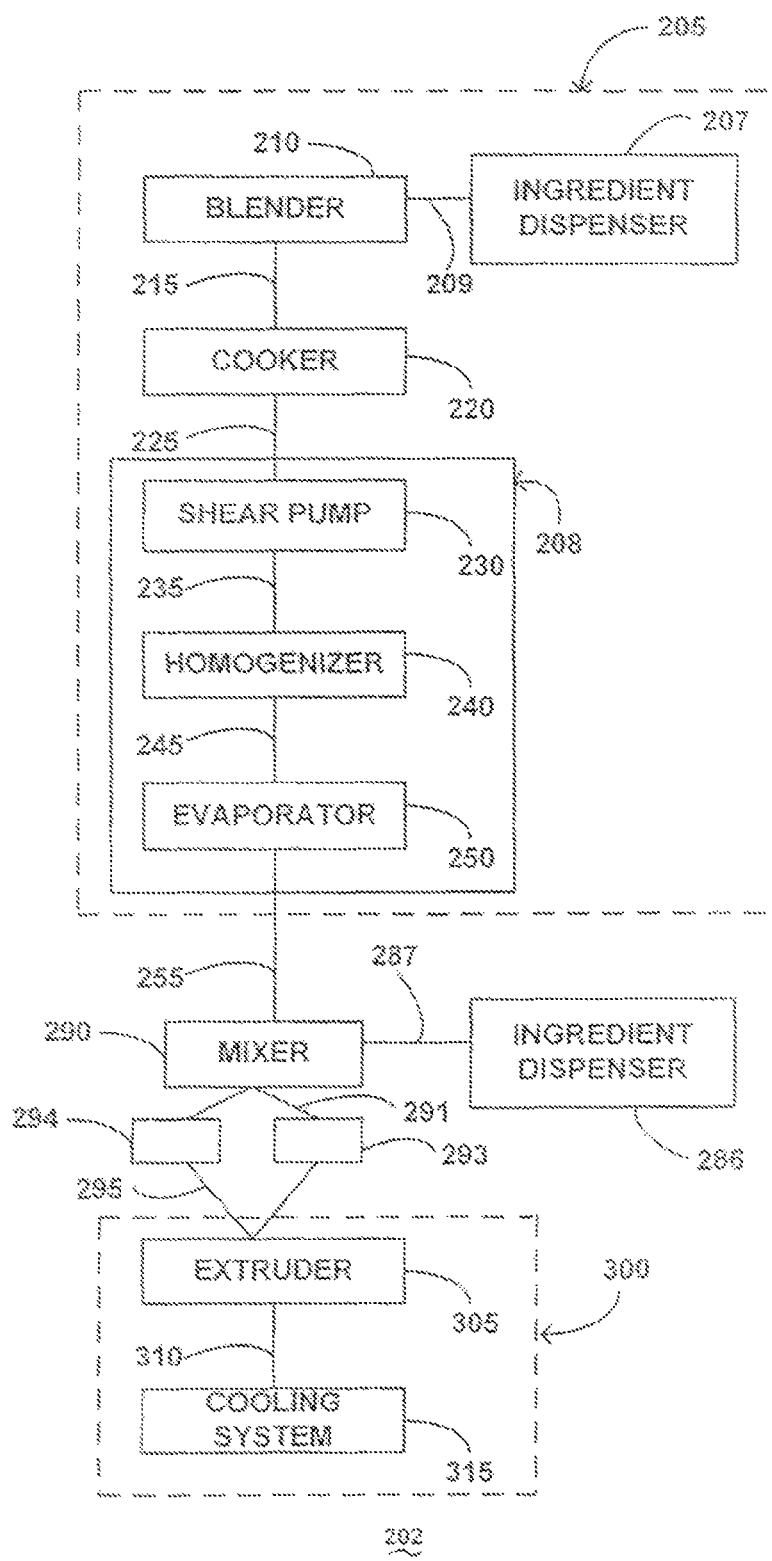
FIG. 7 shows another example of a cheese preparation system that can be used to prepare the soft or firm/semi-hard cheeses that are provided and depicts certain units in the slurry preparation system.

One exemplary system 202 is shown in FIG. 7. The slurry preparation system 205 in this particular system includes several components to cook, shear, homogenize and/or adjust the water content of the slurry that is prepared. More specifically, slurry preparation system 205 in this system includes slurry mixing and moisture control subsystem 208. The particular subsystem 208 shown in FIG. 7 includes shear pump 230, homogenizer 240 and evaporator 250. Subsystem 208 is in communication with cooker 220 and mixer 290.

In the particular subsystem shown in FIG. 7, shear pump 230 of subsystem 208 is connected to cooker 220 via transfer tube 225 to establish a link between the cooker and the subsystem. Shear pump 230 is also connected to homogenizer 240 by transfer tube 235, with homogenizer 240 in turn connected to evaporator 250 by transfer tube 245. Evaporator 250 is connected to mixer 290 by transfer tube 255, thus establishing the connection between subsystem 208 and mixer 290. Slurry preparation system 205 also includes ingredient dispenser 207 that is connected to blender 210 via tube 209.

Thus, in the arrangement shown in FIG. 7, the initial slurry formed in blender 210 can flow to cooker 220 via transfer tube 215. The heated slurry from cooker 220 can subsequently flow into shear pump 230 via transfer tube 225, where the slurry is subjected to the shear conditions described above. The sheared slurry can subsequently be transferred to homogenizer 240 through transfer tube 235, where the slurry and the ingredient(s) it contains are homogenized. The resulting homogenized slurry is then transported through transfer tube 245 into evaporator 250. Evaporator 250 adjusts the moisture content within the ranges listed above. The final slurry then passes from evaporator 250 into mixer 290 via transfer tube 255.

Additional ingredients can be added from additive dispenser 286 to mixer 290 by transfer tube 287. The slurry and ingredients are mixed in mixer 290 to form the admixture. The admixture formed in mixer 290 can then be processed (e.g., extruded and cooled) in final processing system 300. Alternatively, the transfer tube 291 may divert the flow of the admixture between coloring units 293 and 294. Coloring unit 293 may add coloring (e.g., orange) to the admixture to give it the appearance of, for example, cheddar cheese, while coloring unit 294 may add no color and leave the cheese substantially white in color. The entire admixture may be diverted through one or the other coloring units 293 and 294, as well as being adjustable to split the admixture between the coloring units to create, for example, a cheese combination from the admixture. The admixture may then go to the final processing system 300.

It will be appreciated by those of ordinary skill in the art that certain units within slurry preparation system 205 (e.g., cooker 220, shear pump 230, homogenizer 240 and evaporator 250) can be arranged in a variety of other configurations. For instance, although shown as separate units in FIG. 7, shear pump 230 and homogenizer 240 can be part of a single unit in other systems. Other exemplary combinations that can optionally be utilized in still other systems are those in which cooker 220 and shear pump 230 are part of the same unit, and systems in which cooker 220, shear pump 230 and homogenizer 240 are all part of the same integrated unit.

The order in which cooker 220, shear pump 230 and homogenizer 240 appear in FIG. 7 can also be altered in other systems such that all the various permutations are possible. Examples of optional arrangements that can be utilized in other systems include: 1) cooker-homogenizer-shear pump, 2) shear pump-homogenizer-cooker, 3) shear pump-cooker-homogenizer, 4) homogenizer-shear pump-cooker, 5) homogenizer-cooker-shear pump, and the other various permutations.

Some systems do not include shear pump 230, homogenizer 240 and evaporator 250, but instead simply include blender 210 and cooker 220. Other systems include just blender 210.

Different types of blenders can be used to mix the ingredients together to form the initial slurry. In general, the blender simply needs to be capable of mixing relatively viscous materials. Some blenders are horizontal twin screw (auger) types. Ribbon blenders or pipelines that include a series of pumps and static mixers can also be utilized.

The cooker used in these systems can be of various types, including lay-down cooker, swept surface heat exchanger, agitated direct heating pipeline cooker. The cookers are capable of heating a slurry of the compositions defined herein to temperatures ranging from about 90-293° F. (32-145° C.). Specific examples of suitable cookers include the RotaTherm™ cooker available from Gold Peg International Pty. Ltd. (Moorabbin, Vic, Australia), the FusionCooker™, available from Blentech Corporation, (Rohnert Part, Calif.), or a continuous mixer from READCO Manufacturing (York, Pa.), or Exact Mixing Systems (Memphis, Tenn.), or a single or twin screw extruder from Clextral Inc., (Tampa, Fla.). The cookers can heat the slurry by convection (e.g., a heated blanket surrounds the cooker) or by directly injecting steam into the cooker, radiation (e.g., microwave), or combinations of direct/indirect, radiation, and mechanical heating.

Various types of shear pumps can be utilized. Suitable types of shear pumps include in-line mixers, colloid mills, etc. Examples of pumps that can be used include a high shear in-line mixer available from Silverson (East Longmeadow, Mass.) and an in-line mixer from Scott Turbon (Adelanto, Calif.). The shear pump should be capable of generating shear forces of at least 5,000 to greater than 1,000,000 s$^{-1}$.

A number of homogenizers are also suitable for use in the systems that are provided. Examples of homogenizers that can be used include a Gaulin homogenizer available from Gaulin (Kansas City, Mo.) and homogenizer from Waukesha Cherry Burrell (Charlotte, N.C.).

Evaporators of different types can also be utilized. In general, the evaporator should be able to handle relatively viscous solution. Flash vacuum vessels are one example of a suitable evaporator. Evaporators of this type are available from De Dietrich Process Systems (Bridgeton, Mo.). Some systems include a feedback system that is connected to the evaporator (e.g., a near infrared monitor). This system may include a sensor that can monitor the moisture level in the slurry coming from the evaporator and send a signal to the evaporator signaling the evaporator to increase, decrease or maintain the level at which water is removed from the slurry so the desired moisture content in the slurry is achieved.

The specific design of the final processing system can vary, but can include a pre-brine tank that includes super cold sodium chloride brine into which molten cheese or cheese ribbons can flow. A cutter can cut the cheese into loaves as the cheese ribbon exits the pre-brine tank. The cooled and salted loaves are then transferred to a main brine tank where they stay until removed by a conveyor. An exemplary system of this general design is described in U.S. Pat. No. 5,902,625, which is incorporated herein by reference in its entirety for all purposes.

VI. Soft or Firm/Semi-Hard Ripened or Unripened Cheese

The methods that are described herein can be utilized to prepare cheeses that contain one or more of the ingredients at the concentration ranges described herein. As indicated above, some of the methods that are disclosed herein can be utilized to manufacture cheeses that contain ingredients that become functionalize when included in a slurry and are subject to heating and/or hydration. Some of the cheeses can also include relatively high concentrations of certain ingredients.

The soft or firm/semi-hard cheeses that are provided typically have a protein content of about 10-40 wt. %, a moisture content of about 35-65%, and a fat content of about 0-60% on a dry basis (FDB). The actual composition varies somewhat depending upon the particular type of soft or firm/semi-hard cheese that is to be produced. For certain soft or firm/semi-hard cheeses that are provided, the milk fat content is at least 45% by weight of solids and the moisture content is about 52-60 wt. %. The low-moisture soft or firm/semi-hard cheeses (also sometimes referred to as low-moisture mozzarella cheeses) that are provided generally have a minimum milk fat content of 45% by weight of solids and a moisture content that is about 45-52 wt. %. Part skim-milk soft or firm/semi-hard ripened and unripened cheeses (also called part skim mozzarella cheeses) that are provided, in contrast, have a milk fat content that ranges from about 30-45% by weight of solids and a moisture content that is about 52-60 wt %. The low-moisture, part-skim soft or firm/semi-hard ripened and unripened cheeses (also referred to as low-moisture, part skim mozzarella cheeses) that are provided usually have a milk fat content of about 30-45% by weight of the solids and a moisture content of about 45-52 wt %. The foregoing moisture percentages are for bound plus free water, i.e., the percent of weight lost when the cheese is dried for 17 hrs±1 hr in a 100° C. oven.

The cheeses that are provided can be in a variety of different forms including loaves, Ribbons™, comminuted forms (e.g., diced, sliced, or shredded forms) and other forms known in the art. The pH of the cheese generally ranges from about 5.00 to about 6.00, such as about 5.10 to about 5.90.

VII. Food Products and Methods of Manufacturing Such Food Stuffs

The soft or firm/semi-hard cheeses that are provided can be utilized in essentially baking application that involves the use of cheese and can be incorporated into a wide variety of food products. The cheeses, for instance, can be included as an ingredient in a variety of convenience foods, including entrees, snack foods and appetizers.

The term "food product" is intended to broadly encompass any type of food to which one can add cheese. Examples of suitable types of foods into which the provided cheeses can be added, include, but are not limited to: cereal-based products; poultry, beef, pork or seafood-based entrees; potatoes; vegetables; fruit; candy; and nuts. The cereal-based products can be of diverse types including, for instance, pizzas, burritos, dough-enrobed sandwiches, hand-held foods, breads, bagels, pastries, and grain-based snack foods (e.g., crackers and pretzels). The cheese can be included with a variety of different forms of potatoes, including, chips, French fries, hash browns, and strings. Likewise, vegetables of various types can be combined with the cheeses that are provided. Exemplary vegetables include, mushrooms, zucchini, peppers (e.g., jalapenos) and cauliflower.

The cheeses can be incorporated into the food product, layered onto or in the foodstuff or used as a coating. One common use, for example, is as an exposed cheese on a pizza or as the string cheese rolled in the outer lip of a pizza crust (a so-called "stuffed crust pizza").

As those skilled in the art will recognize, the foregoing list is simply illustrative and is not intended to be an exhaustive list of the types of foods that can be combined with the soft or firm/semi-hard cheeses that are provided herein.

The cheeses that are provided are suitable for use in essentially any type of cooking including convection heating, steam injection heating and microwave heating, for example. In some microwave heating applications, for example, the food product is exposed to microwave energy in an amount and for a duration sufficient to heat and melt the cheese, whereby the cheese melts to form a uniform mass of cheese. The cheeses can generally be heated in a variety of microwaves, such as microwaves having wattages of 400-1000 watts, or full power microwave ovens of 650-850 watts that are common home microwave ovens. The cheeses can be cooked over a range of cooking times such as from 0.5 to 20 minutes, or 0.5-10 minutes, or 2-5 minutes, which are the typical microwave cook times used to prepare frozen or refrigerated entrees and appetizers.

The soft or firm/semi-hard cheeses that are disclosed herein can be combined with food products such as those just listed using any of a variety of methods. For example, the food product can be dipped in melted cheese. Alternatively, the cheese can be sprinkled or layered onto the food product using conventional food processing equipment. In such processes, the cheese is typically first comminuted to form relatively small pieces of cheese or shredded cheese. Once the cheese has been combined with the food product, the resulting food product can optionally be refrigerated or frozen for future sale or use.

EXAMPLES

Shred qualities and melt grades for four different production runs of Mozzarella cheeses were measured and compared. In all four examples, non-fat dry milk (NDM) was incorporated into the Mozzarella cheese. In two of the examples (Examples A and B), 6.0%, by weight, of NDM was added to the cheese, while for the other two examples (Examples C and D), 12.0%, by wt., NDM was added. In two of the examples (Examples A and C), the NDM was added to the Mozzarella cheese directly as a dry powder, while in the other two examples (Examples B and D) the NDM was mixed into the Mozzarella curd and heated to less than 150° F. (65.6° C.) in the absence of exogenous water to form the final Mozzarella product. Table 1 lists the conditions for each of the four Examples A-D:

TABLE 1

Processing Parameters for Runs A-D

| Run No. | Wt. % NDM Added | NDM Addition Method |
|---|---|---|
| A | 6.0% | NDM Powder Added to Mozzarella Cheese |
| B | 6.0% | NDM Added to Mozzarella Curd & Heated In Absence of Exogenous Water |
| C | 12.0% | NDM Powder Added to Mozzarella Cheese |
| D | 12.0% | NDM Added to Mozzarella Curd & Heated In Absence of Exogenous Water |

For all the runs, the Mozzarella cheeses used conventional starter cultures to produce cheeses with target compositions of 49.0% moisture, 40.0 FDB, 5.35 pH, and 1.80% salt. Ribbon™ cheese (7×9×2-inches) was extruded, and the packaged cheese samples were stored at 35° F. (1.7° C.) for 14 days. The cheese samples were shredded into cuts (1.25-3 inches×0.20 inches×0.095 inches) on an Urchell CC shredder (Urchell Laboratories, Inc. Indiana, USA). The shredded cheese cuts were frozen individually and stored at −20° F.

Two-pound samples of cheese were removed, thawed at 35° F. (1.7° C.), and melted on both frozen pizzas and food service pizzas. The cheeses melted on a frozen pizza had 5.6 ounces of frozen cheese placed on a ready-made crust and 3 ounces of sauce and frozen for 24 hours prior to melting in a home oven at 425° C. for 19 minutes. The cheeses melted on food service pizzas had 7 ounces of cheese on a regular pizza crust, together with 4 ounces of pizza sauce. The pizzas were cooked on a conveyor-bake pizza (Middleby Marshall oven at 420° F. (215.6° C.) for 6 minutes 30 seconds).

The shred cut qualities and melt grades of the cheeses produced in Examples a-d were then measured. The melt grade measurements of the cheeses on the service oven pizzas and cooked frozen pizzas included comparisons of the blister color, blister %, blister size, melt, stretch, and oiling-off. The melt grade measurements were made with a 20-point scale, with 10 being the best grade, while 1 is too little, and 20 is too much. Table 2 summarizes the melt grade grading system:

TABLE 2

Melt Grade Grading System

| | NONE | SLIGHT | MODERATE | DEFINITE | PRONOUNCED |
|---|---|---|---|---|---|
| Score | 1 to 4 | 5 to 8 | 8 to 12 | 12 to 16 | 16 to 20 |
| Blister % | 0-10% | 10-25% | 25-50% | 50-75% | >75% |
| Blister Size | ⅛ to ¼' | ⅜ to ½' | ⅝ to ¾' | ⅞ to 1' | >1' |
| Blister Color | Light Golden | Golden to Light Golden | Brown | Dark Brown | Black |
| Oiling Off | None | Even sheen over cheese surface | Some minor areas with slight pooling | Noticeable collection areas | Entire surface heavily coated with oil |
| Meltdown | Cheese does not fuse together after cooking | Appears fused together but shows minor jigsaw appearance | Cheese completely fused together | Cheese is slightly soupy and sauce appears to bleed through | Cheese is very runny, soupy and appears weak in body |
| Stretch | 0 to 1' | 1½ to 3' | 3 to 5' | 5 to 7' | >7' |

The shred quality measurements of the cheeses included comparisons of shred quality and shred compaction. These measurements were made on a 4-point scale with 1 being the best, and 4 being the least acceptable. Table 3 summarizes the results of the melt grade and shred quality measurements for Examples A-D.

TABLE 3

Shred Quality and Melt Grades

| | Food Service Pizza | | | | | | Frozen Pizza | | | Cut Quality | |
|---|---|---|---|---|---|---|---|---|---|---|---|
| | Blister % | Blister Size | Blister Color | Oiling Off | Melt | Stretch | Blistering | Melt | Stretch | Compaction | Shred Quality |
| Example a. 6.0% NDM added as powder | 3 | 1 | 14 | 4 | 10 | 12 | 1 | 7 | 8 | 1.5 | 2.0 |

TABLE 3-continued

Shred Quality and Melt Grades

| | Food Service Pizza | | | | | | Frozen Pizza | | | Cut Quality | |
|---|---|---|---|---|---|---|---|---|---|---|---|
| | Blister % | Blister Size | Blister Color | Oiling Off | Melt | Stretch | Blistering | Melt | Stretch | Compaction | Shred Quality |
| Example b. 6.0% NDM added to curd and heated | 7 | 3 | 16 | 2 | 9 | 8 | 1 | 9 | 6 | 2.0 | 2.0 |
| Example c. 12.0% NDM added as powder | 4 | 2 | 15 | 3 | 12 | 8 | 3 | 12 | 6 | 2.0 | 2.5 |
| Example d. 12.0% NDM added to curd and healed | 10 | 4 | 18 | 1 | 6 | 4 | 1 | 4 | 2 | 2.5 | 3.0 |

The cheeses prepared by mixing and heating NDM and Mozzarella cheese curd in the absence of exogenous water, can also increase the yield of the finished cheese. When the Mozzarella curd is placed in a wet mixer for kneading and plasticizing, the hot (e.g., 152° F. to 160° F.) exogenous water contacting the curd can absorb some curd materials, such as butterfat, protein, total solids, etc. Post wet mixing analysis of the exogenous water shows the water contained an average of 1.09% fat, 0.33% protein, and 4.41% total solids from the Mozzarella cheese curd. This represents about 17.6 lbs of lost curd materials for an average amount of exogenous overflow liquid collected. If these materials remained in the curd, the yield of the finished cheese increases 1.2%, by weight. This is the increased yield of finished cheese realized by heating and mixing the NDM and cheese curd in the absence of exogenous water.

Figure 8A:
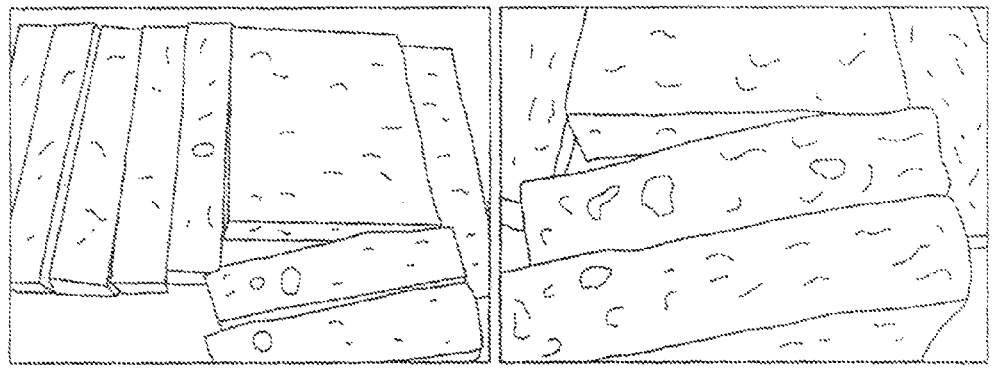
FIGS. 8A-B show cross sectional samples of finished cheeses.
Figure 8B:
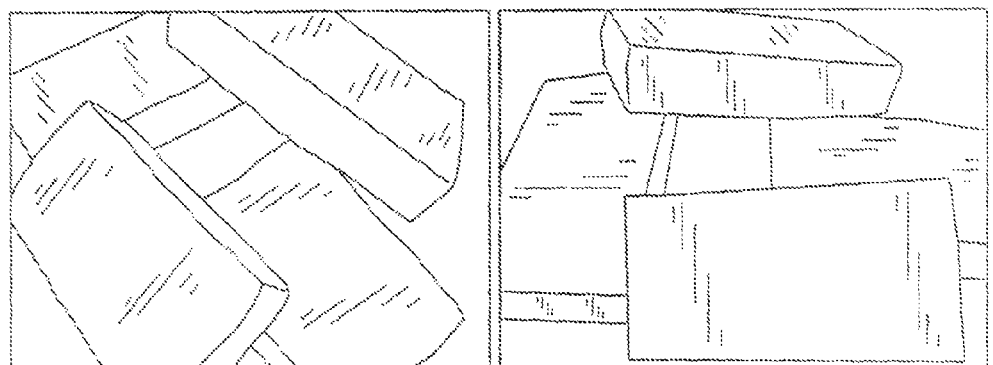

The pictures of the sample cheeses shown in FIGS. 8A-B illustrate quality differences between cheese prepared by adding NDM as a dry powder directly to Mozzarella, and those prepared by adding the NDM to cheese curd that is then heated in the absence of exogenous water. The direct addition of dry powder NDM resulted in powdered lumps forming in the finished cheese as shown in FIG. 8A. These lumps can break dicer blades during the shredding process and diminish product quality from the customer prospective. In contrast, the same levels of NDM added to Mozzarella cheese curd, which was then heated to less than 150° F., resulted in a smooth, homogenous finished cheese without powdered lumps, as shown in FIG. 8B.

It is understood that the examples and embodiments described herein are for illustrative purposes only and that various modifications or changes in light thereof will be suggested to persons skilled in the art and are to be included within the spirit and purview of this application and scope of the appended claims. The cheeses of the present invention may be made by the methods described herein, or by any other method that produces a finished cheese product having the same physical or chemical properties as the present cheeses. All publications, patents and patent applications cited herein are hereby incorporated by reference in their entirety for all purposes to the same extent as if each individual publication, patent or patent application were specifically and individually indicated to be so incorporated by reference.

What is claimed is:

1. A pasta filata cheese comprising:
   a lactose concentration of about 0.5 to 25 wt. %; and
   a non-fat dry milk concentration of at least 6 wt. %,
   wherein the non-fat dry milk is incorporated into the pasta filata cheese through a slurry comprising the non-fat dry milk, and wherein the slurry has been subjected to at least one of:
   (i) exposing the slurry to high shear conditions;
   (ii) homogenizing the slurry;
   (iii) heating the slurry; and
   (iv) adjusting the water content of the slurry,
   wherein the pasta filata cheese does not have any powdered lumps of the non-fat dry milk, and
   wherein the pasta filata cheese comprises a block cheese, a ribbon cheese, a string cheese, a comminuted cheese, a diced cheese, or a shredded cheese, and
   wherein the pasta filata cheese has a moisture content of about 45 to 60 wt. %.

2. The pasta filata cheese of claim 1, wherein the cheese has a starch concentration of about 0.5 to about 26 wt. %.

3. The pasta filata cheese of claim 1, wherein the non-fat dry milk concentration is at least 12 wt. %.

4. The pasta filata cheese of claim 1, wherein the cheese has a gum or cellulose concentration of about 0.1 to about 20 wt. %.

5. The pasta filata cheese of claim 1, wherein the cheese has a protein content of about 5-40 wt. %.

6. The pasta filata cheese of claim 1, wherein the cheese has a milk fat content of about 30-45 wt. %.

7. The pasta filata cheese of claim 1, wherein the cheese comprises one or more additional ingredients chosen from the group of an acidity regulator, an acid, an anticaking agent, an antifoaming agent, a coloring agent, an emulsifier, an enzyme preparation, a flavoring agent, a finning agent, a gelling agent, a preservative, a stabilizer, a cheese powder, a salt, a nutritional supplement, an acid, an enzyme, a neutraceutical, a carbohydrate, a vitamin, and a mineral.

8. The pasta filata cheese of claim 1, wherein the cheese further comprises at least one additional dairy solid chosen from the group of whey protein concentrate, casein hydrolyzate, milk fat, lactalbumin, cream, milk protein concentrate, milk protein isolate, casein, whey protein isolate, hydrolyzed whey protein, denatured whey protein, skim cheese powder, and natural casein isolate.

9. The pasta filata cheese of claim 1, wherein the starch comprises at least one of potato starch, pea starch, tapioca starch, corn starch, wheat starch, or rice starch.

10. The pasta filata cheese of claim 1, wherein the gum or cellulose comprises at least one of microcrystalline cellulose, powdered cellulose, methyl cellulose, propylene glycol alginate, sodium alginate, xanthan gum, guar gum, konjac flour or locust bean gum.

11. The pasta filata cheese of claim 1, wherein the pasta filata cheese comprises mozzarella cheese.

12. A pasta filata cheese comprising:
lactobionic acid or a salt thereof; and
a non-fat dry milk concentration of at least 6 wt. %,
wherein the non-fat dry milk is incorporated into the pasta filata cheese through a slurry comprising the non-fat dry milk, and wherein the slurry has been subjected to at least one of:
(i) exposing the slurry to high shear conditions;
(ii) homogenizing the slurry;
(iii) heating the slurry; and
(iv) adjusting the water content of the slurry,
wherein the pasta filata cheese does not have any powdered lumps of the non-fat dry milk, and
wherein the pasta filata cheese comprises a block cheese, a ribbon cheese, a string cheese, a comminuted cheese, a diced cheese, or a shredded cheese, and
wherein the pasta filata cheese has a moisture content of about 35 to 65 wt. %.

13. The pasta filata cheese of claim 12, wherein the pasta filata cheese has a starch concentration of about 0.5 to about 26 wt. %.

14. The pasta filata cheese of claim 12, wherein the pasta filata cheese has an additional dairy solid with a concentration of about 0.5 to about 35 wt. %.

15. The pasta filata cheese of claim 12, wherein the pasta filata cheese has cheese has a gum or cellulose concentration of about 0.1 to about 20 wt. %.

16. The pasta filata cheese of claim 12, wherein the pasta filata cheese comprises a lactose concentration of about 0.5 to 25 wt. %.

17. The pasta filata cheese of claim 12, wherein the pasta filata cheese has a moisture content of about 52-60 wt. %.

18. The pasta filata cheese of claim 12, wherein the pasta filata cheese has a protein content of about 5-40 wt. %.

19. The pasta filata cheese of claim 12, wherein the pasta filata cheese has a milk fat content of about 30-45 wt. %.

20. The pasta filata cheese of claim 12, wherein the non-fat dry milk concentration is at least 12 wt. %.

21. The pasta filata cheese of claim 12, wherein the pasta filata cheese comprises one or more additional ingredients chosen from the group of an acidity regulator, an anticaking agent, an antifoaming agent, a coloring agent, an emulsifier, an enzyme preparation, a flavoring agent, a finning agent, a gelling agent, a preservative, a stabilizer, a cheese powder, a salt, a nutritional supplement, an enzyme, a neutraceutical, a carbohydrate, a vitamin, and a mineral.

22. The pasta filata cheese of claim 13, wherein the starch comprises at least one of potato starch, pea starch, tapioca starch, corn starch, wheat starch, or rice starch.

23. The pasta filata cheese of claim 14, wherein the dairy solid comprises at least one of whey protein concentrate, casein hydrolyzate, milk fat, lactalbumin, cream, milk protein concentrate, milk protein isolate, lactose, casein, whey protein isolate, hydrolyzed whey protein, denatured whey protein, skim cheese powder, or natural casein isolate.

24. The pasta filata cheese of claim 15, wherein the gum or cellulose comprises at least one of microcrystalline cellulose, powdered cellulose, methyl cellulose, propylene glycol alginate, sodium alginate, xanthan gum, guar gum, konjac flour or locust bean gum.

25. A pasta filata cheese comprising:
a lactose concentration of about 0.5 to 25 wt. %;
lactobionic acid or a salt thereof; and
a non-fat dry milk concentration of at least 6 wt. %,
wherein the non-fat dry milk is incorporated into the pasta filata cheese through a slurry comprising the non-fat dry milk, and wherein the slurry has been subjected to at least one of:
(i) exposing the slurry to high shear conditions;
(ii) homogenizing the slurry;
(iii) heating the slurry; and
(iv) adjusting the water content of the slurry,
wherein the pasta filata cheese does not have any powdered lumps of the non-fat dry milk, and
wherein the pasta filata cheese comprises a block cheese, a ribbon cheese, a string cheese, a comminuted cheese, a diced cheese, or a shredded cheese.

26. The pasta filata cheese of claim 25, wherein the pasta filata cheese has a moisture content of about 35 to 65 wt. %.

27. The pasta filata cheese of claim 25, wherein the pasta filata cheese has a starch concentration of about 0.5 to about 26 wt. %.

28. The pasta filata cheese of claim 25, wherein the pasta filata cheese comprises an additional dairy solid having a concentration of about 0.5 to about 35 wt. %.

29. The pasta filata cheese of claim 25, wherein the pasta filata cheese comprises a gum or cellulose concentration of about 0.1 to about 20 wt. %.

30. The pasta filata cheese of claim 12, wherein the pasta filata cheese comprises a lactobionic acid or salt thereof that adjusts a pH of the cheese to about 5-6.

* * * * *

UNITED STATES PATENT AND TRADEMARK OFFICE
CERTIFICATE OF CORRECTION

| | | |
|---|---|---|
| PATENT NO. | : 9,681,676 B2 | Page 1 of 1 |
| APPLICATION NO. | : 14/064372 | |
| DATED | : June 20, 2017 | |
| INVENTOR(S) | : Richard K. Merrill and Mayank Singh | |

It is certified that error appears in the above-identified patent and that said Letters Patent is hereby corrected as shown below:

On the Title Page

Item (73) Assignee: Please remove "Corporation" and insert --Company--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*